US007007965B2

(12) United States Patent
Bernatsky et al.

(10) Patent No.: US 7,007,965 B2

(45) Date of Patent: Mar. 7, 2006

(54) CENTER-OF-GRAVITY TILT-IN-SPACE WHEELCHAIR

(75) Inventors: Todd Bernatsky, Lafayette, CO (US); Philip Schreiber, Denver, CO (US); Tom Whelan, Longmont, CO (US); Wayne Hanson, Bozeman, MT (US); Steven L. Lindquist, Arvada, CO (US); Jerry Houtart, Longmont, CO (US); Richard Schneider, Loveland, CO (US); Allen B. Killebrew, Longmont, CO (US); Mike Nordquist, Longmont, CO (US)

(73) Assignee: Sunrise Medical HHG Inc., Longmont, CO (US)

( * ) Notice: Subject to any disclaimer, the term of this patent is extended or adjusted under 35 U.S.C. 154(b) by 0 days.

(21) Appl. No.: 10/403,998

(22) Filed: Mar. 31, 2003

(65) Prior Publication Data

US 2004/0188979 A1 Sep. 30, 2004

(51) Int. Cl.
*B62J 1/00* (2006.01)

(52) U.S. Cl. .............................. 280/304.1; 280/250.1; 297/317; 297/318

(58) Field of Classification Search ............ 280/250.1, 280/304.1, 149.2, DIG. 10; 180/209, 907; 114/194; 297/317, 318, DIG. 4

See application file for complete search history.

(56) References Cited

U.S. PATENT DOCUMENTS

| | | | | |
|---|---|---|---|---|
| 2,195,428 A | * | 4/1940 | Searing | 114/194 |
| 2,313,023 A | | 3/1943 | Ruegger | |
| 4,462,604 A | | 7/1984 | Meyer | |
| 4,515,337 A | * | 5/1985 | Torras | 248/371 |
| 4,592,570 A | | 6/1986 | Nassiri | |
| 4,679,816 A | | 7/1987 | Riikonen | |

(Continued)

OTHER PUBLICATIONS

Brochure of The BUG, published by Plainsense, Oct. 2002.

(Continued)

*Primary Examiner*—Tony Winner

(74) *Attorney, Agent, or Firm*—MacMillan, Sobanski & Todd, LLC

(57) ABSTRACT

A center-of-gravity tilt-in-space wheelchair includes a base, a seat for supporting an occupant, and tracks supporting the seat for selective seat movement relative to the base. Wheels are adapted to support the base relative to a supporting surface. The tracks serve as rolling or sliding surfaces that allow the seat to rotate with respect to the base. Each track has a constant-radius arc with a focal point that is adapted to be coincident with the center of gravity of the wheelchair occupant. A low-friction supports the base relative to the seat. The low-friction support may include low friction elements that mate with the tracks to support for the tracks. The support can be adjustable to permit the overall tilt angle range of the tracks to be adjusted. The wheelchair seat can be adjusted to maintain the focal point of the constant-radius arc of the tracks coincident with the center of gravity of the wheelchair occupant. The front and rear wheels can be adjusted fore and aft relative to the focal point. A coupling includes plates having upper ends operatively attached to one another with seat canes therebetween and lower ends releasably attached relative to the side tubes. The lower ends can be movable in a longitudinal direction relative to the side tubes while remaining operatively connected to the side tubes. A base frame can include side frames having an offset at a front end and a caster housing supported by the offset. The offset is directed up to minimize the height of the side frames and down to maximize the height.

32 Claims, 17 Drawing Sheets

U.S. PATENT DOCUMENTS

| | | | |
|---|---|---|---|
| 4,759,561 | A | 7/1988 | Janssen |
| 4,842,232 | A | 6/1989 | Pipon et al. |
| 4,893,827 | A | 1/1990 | Gay et al. |
| 5,267,745 | A | 12/1993 | Robertson et al. |
| 5,320,373 | A | 6/1994 | Robertson et al. |
| 5,360,224 | A | 11/1994 | Geiger et al. |
| 5,409,247 | A | 4/1995 | Robertson et al. |
| 5,967,609 | A | 10/1999 | Potter |
| 5,971,482 | A | 10/1999 | Goertzen et al. |
| 6,003,891 | A | 12/1999 | Broadhead |
| 6,012,774 | A | 1/2000 | Potter |
| 6,050,642 | A | 4/2000 | Erb |
| 6,056,363 | A | 5/2000 | Maddox |
| 6,126,186 | A | 10/2000 | Mascari |
| 6,203,106 | B1 | 3/2001 | Nearing et al. |
| 6,206,393 | B1 | 3/2001 | Mascari et al. |
| 6,270,111 | B1 | 8/2001 | Hanson et al. |
| 6,276,704 | B1 | 8/2001 | Suiter |
| 6,357,776 | B1 | 3/2002 | Goertzen et al. |
| 6,382,725 | B1 | 5/2002 | Carroll |
| 6,409,265 | B1 | 6/2002 | Koerlin et al. |
| 6,425,635 | B1 | 7/2002 | Pulver |
| 6,505,365 | B1 | 1/2003 | Hanson et al. |
| 6,516,480 | B1 | 2/2003 | Elliott |
| 2001/0002081 | A1 | 5/2001 | Toppses |
| 2001/0011805 | A1 | 8/2001 | Kueschall |

OTHER PUBLICATIONS

Webpage of the Rx Rocker, published by Rx Rocker, Dec. 1, 2004.

Webpage describing the Rx Rocker, and published by Abledata, May 11, 2005.

* cited by examiner

CENTER-OF-GRAVITY TILT-IN-SPACE WHEELCHAIR

BACKGROUND OF INVENTION

This invention relates generally to land vehicles and more particularly to wheelchairs. Most particularly, the invention relates to a center-of-gravity tilt-in-space wheelchair having a seat assembly supported relative to a base by a rocker that has a curvature the focal point of which is coincident with the center of gravity of the wheelchair occupant so that the center of gravity of the wheelchair occupant remains at a fixed location during tilting.

Tilting wheelchairs are well known. Such wheelchairs are typically used in highly dependent or geriatric care, wherein the ability to reposition a wheelchair occupant in various angular positions is beneficial to the occupant's health and daily routine. Tilting a wheelchair occupant relieves pressure to the wheelchair occupant's ischial tuberosities (i.e., the bony prominence of the buttocks). Continuous pressure to the wheelchair occupant's ischial tuberosities, which is applied when the wheelchair occupant remains in a single seated position, can cause the development of decubitus ulcers (i.e., pressure sores). For wheelchair occupants with severe kyphosis (i.e., curvature of the spine), seated tilting may allow the occupant to look forward and interact with their surroundings. Tilting may also be beneficial to assist with proper respiration and digestion.

Some wheelchair occupants require attendant care, wherein an attendant is responsible for positioning the wheelchair seat angle, often changing the angle on a prescribed schedule. The ability to tilt the wheelchair occupant offers the occupant a variety of positions that accommodate their daily schedule, including, for example, an anterior tilt for eating at a table and posterior tilt for resting.

Conventional tilting wheelchairs consist of a seat frame that is pivotally mounted to a base frame so that the seat frame tilts to reposition the wheelchair occupant. The pivot axis is typically mounted between the base frame and seat frame, towards the rear of the seat and away from the occupant's center of gravity. Tilting the occupant involves lifting or lowering his or her center of gravity and therefore requires effort on the part of the attendant. Mechanisms, such as springs or gas cylinders, are often employed to assist in tilting the occupant. Typically, levers are attached to handles on a tilting wheelchair. The levers allow an attendant to release a locking mechanism, change the tilt angle by pushing or pulling on the handles, and engage the locking mechanism, which fixes the tilt angle.

Tilting in conventional tilt wheelchairs may invoke a reaction on the part of the occupant who experiences the sensation of being tipped over. The occupant experiences a sensation of being pitched off balance during tilting. Conventional tilt wheelchair designs involve translation of the wheelchair occupant's center of gravity during tilting. Significant effort on the part of the attendant may be required to tilt the wheelchair occupant when the occupant's mass translates during tilting. Moreover, conventional tilt wheelchairs require large base frames and anti-tip devices because tilting the chair displaces the occupant's center of gravity fore and aft over the wheelbase, potentially placing the wheelchair off balance.

What is needed is a wheelchair that does not evoke the sensation of being tipped over; that requires minimal effort on the part of the attendant to tilt (i.e., no lifting or lowering of the wheelchair occupant's center of gravity should be required to tilt the wheelchair); does not affect weight distribution between the front and rear wheels; and that is limited to pure rotation (i.e., the only effort required is to overcome friction within the system), thus eliminating the need for springs or gas cylinders to assist tilting.

SUMMARY OF INVENTION

The present invention is directed towards a center-of-gravity tilt-in-space wheelchair that overcomes the foregoing deficiencies. The wheelchair comprises a base, a seat for supporting an occupant, and one or more tracks supporting the seat for movement relative to the base. A plurality of wheels is adapted to support the base relative to a supporting surface (i.e. the floor). The tracks rest on rollers or slides that allow the seat to rotate with respect to the base. The tracks have a constant-radius arc with a focal point that is adapted to be coincident with the center of gravity of the wheelchair occupant. Another embodiment of the invention has a low-friction support supported by one of either the base or the seat, wherein the low-friction support comprises upper and lower rollers or slides that mate with the tracks to provide sole support for the tracks. In yet another embodiment of the invention, the low friction support is adjustable to permit the tilt angle of the tracks to be adjusted. In still another embodiment of the invention, the wheelchair seat is adjustable so as to maintain the focal point of the constant-radius arc of the tracks coincident with the center of gravity of the wheelchair occupant.

The present invention is also directed towards seat back canes, side tubes, and plates having upper ends that are operatively attached to one another with the canes secured therebetween and lower ends that are releasably attached relative to the side tubes. The lower ends are movable in a longitudinal direction relative to the side tubes while remaining operatively connected to the side tubes. This permits the position of the canes to be longitudinally adjusted relative to the side tubes.

The present invention is further directed towards a wheelchair base frame comprising side frames having an offset at a front end thereof. A caster housing is supported by the offset. The side frame is selectively positioned to direct the offset up to minimize the height of the side frames relative to a supporting surface and direct the offset down to maximize the height of the side frames relative to the supporting surface.

Various objects and advantages of this invention will become apparent to those skilled in the art from the following detailed description of the preferred embodiment, when read in light of the accompanying drawings.

DETAILED DESCRIPTION

Figure 1:
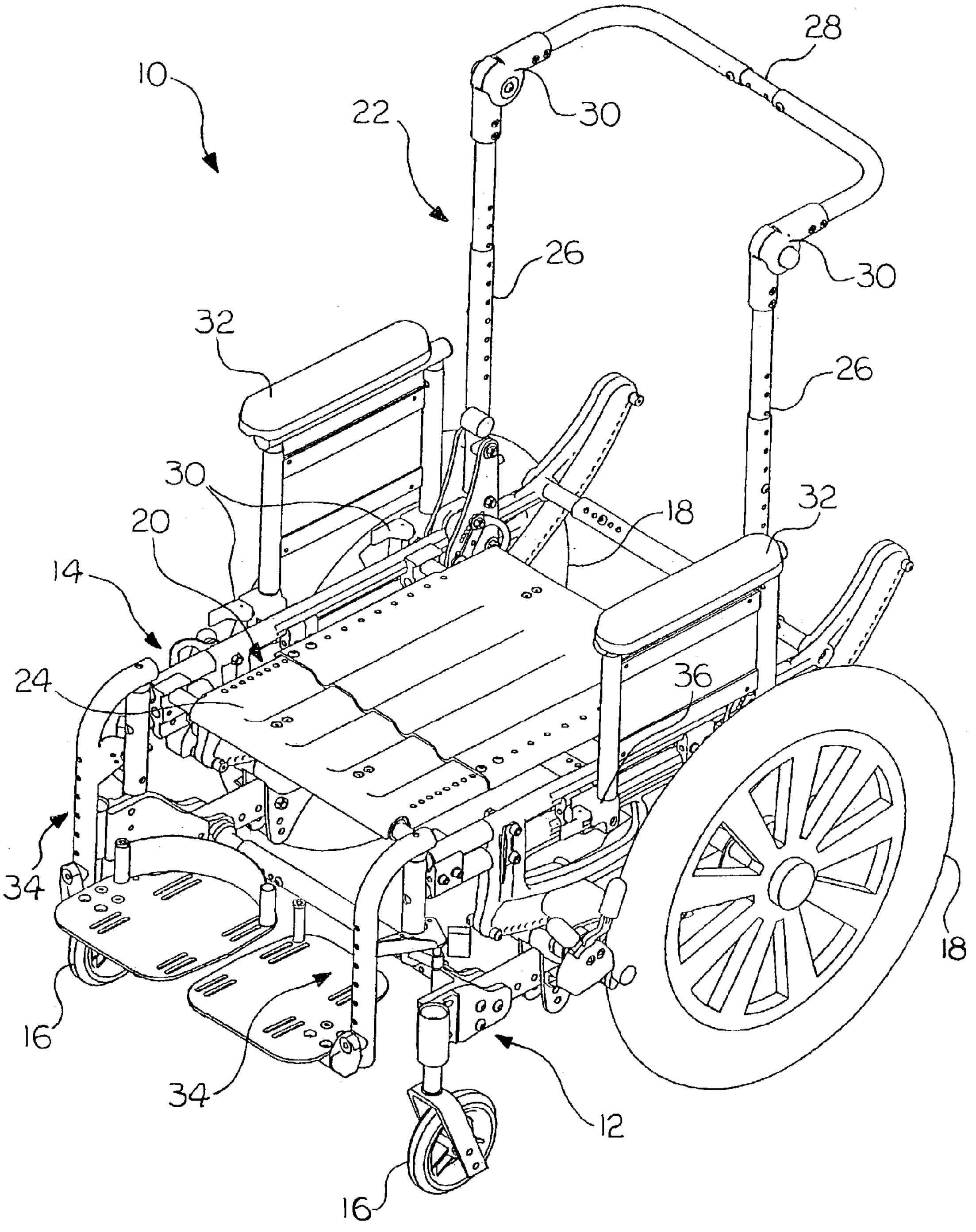
FIG. 1 is a front perspective view of a center-of-gravity tilt-in-space wheelchair according to a preferred embodiment of the invention.
Figure 2:
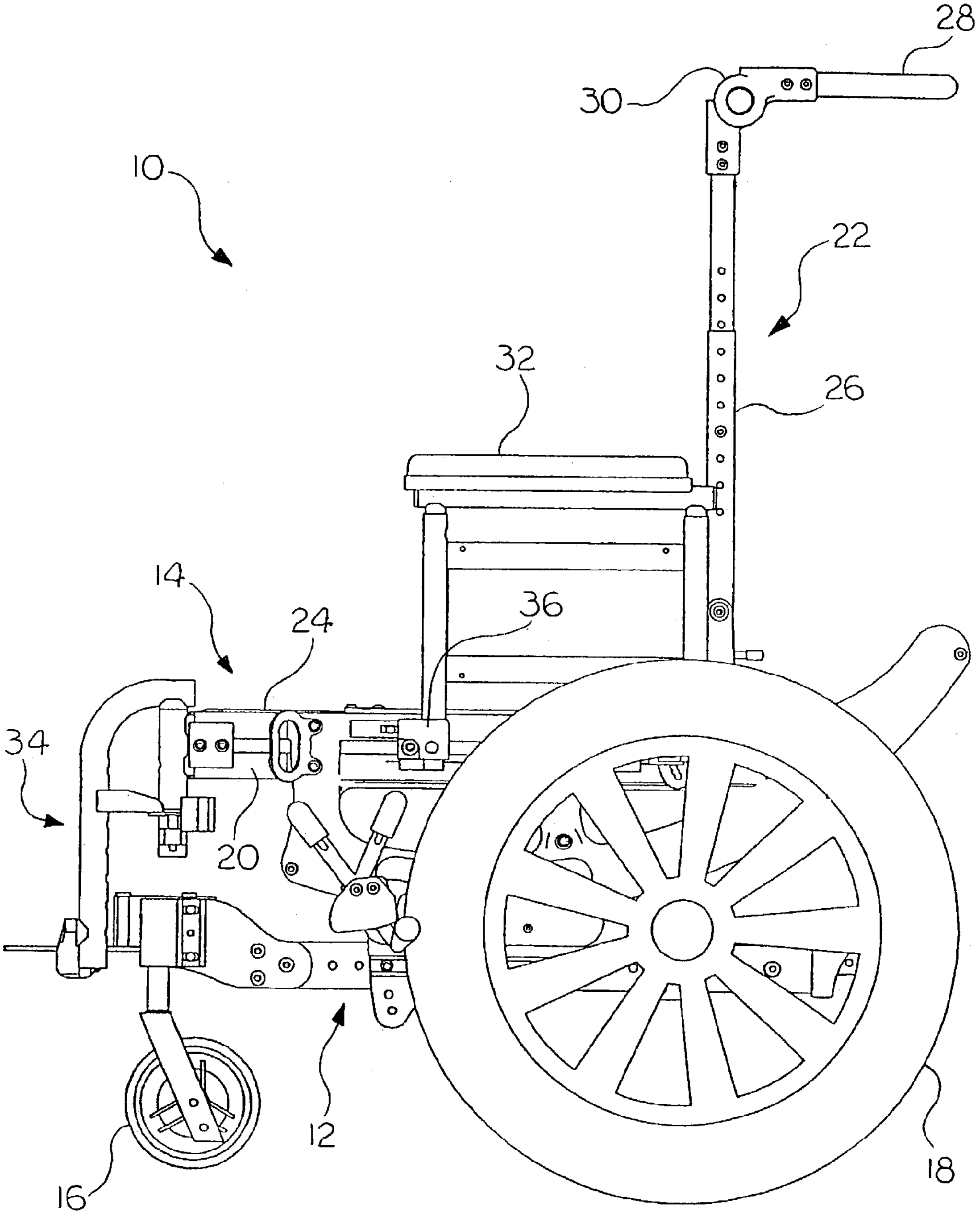
FIG. 2 is a side elevational view of the wheelchair shown in FIG. 1.

Referring now to the drawings, there is illustrated in FIGS. 1 and 2 a center-of-gravity tilt-in-space wheelchair, as generally indicated at 10. The wheelchair 10 has a base 12 and a seat assembly 14 supported by the base 12. The base 12 is supported on a supporting surface by wheels, such as the front casters 16 and the rear wheels 18 shown. The rear wheels 18 are preferably driven wheels, which may be manually driven or power driven.

The seat assembly 14 has a seat frame 20 and a seat back 22. The seat frame 20 includes longitudinally extending tubes for supporting a seat 24, which can be in the form of a semi-rigid or rigid pan, as shown, or a sling (not shown). The seat 24 may include mating parts, as shown, that are longitudinally adjustable relative to one another to permit the length of the seat 24 to be adjusted. The seat back 22 preferably includes laterally spaced canes 26 for supporting a backrest (not shown). The canes 26 are preferably formed of telescopic tubes that permit the length of the canes 26 to be adjusted. A handle 28 may be supported by the canes 26. In the illustrated embodiment, the handle 28 is pivotally coupled to the canes 26, preferably by couplings 30 that are adapted to releasably hold the handle 28 in a fixed relation to the canes 26.

The seat frame 20 is preferably adapted to support armrests 32 and footrest assemblies 34. The armrests 32 may be releasably attached to the seat frame 20 and movable in a longitudinal direction relative to the seat frame 20. The armrests 32 may be held in fixed relation to the seat frame 20 in any conventional manner, such as by the tube clamps 36 shown. The footrest assemblies 34 are also releasably and movably attached to the seat frame 20.

Figure 3:
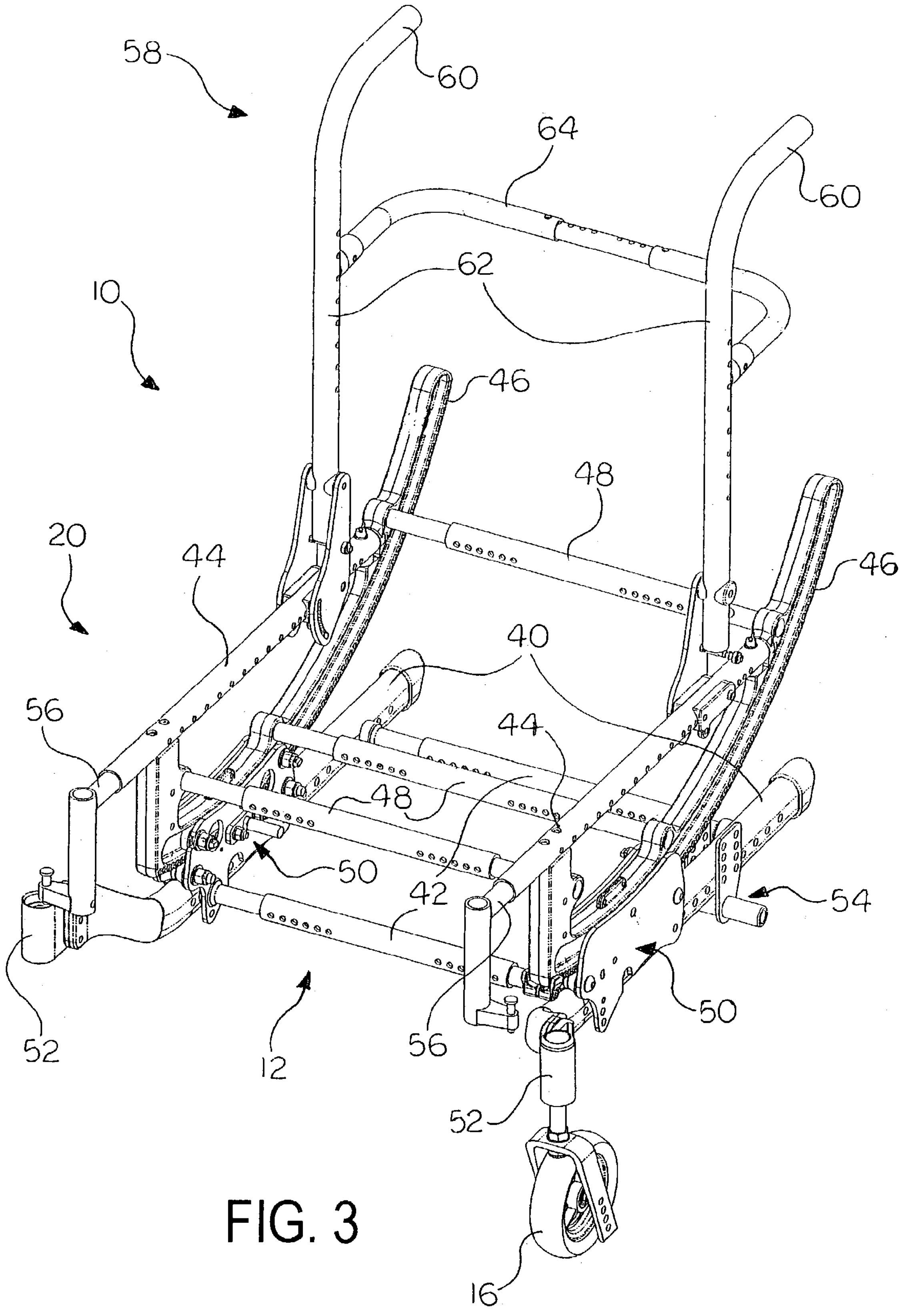
FIG. 3 is a front perspective view of a base frame and a seat frame of the wheelchair with an alternative backrest.
Figure 4:
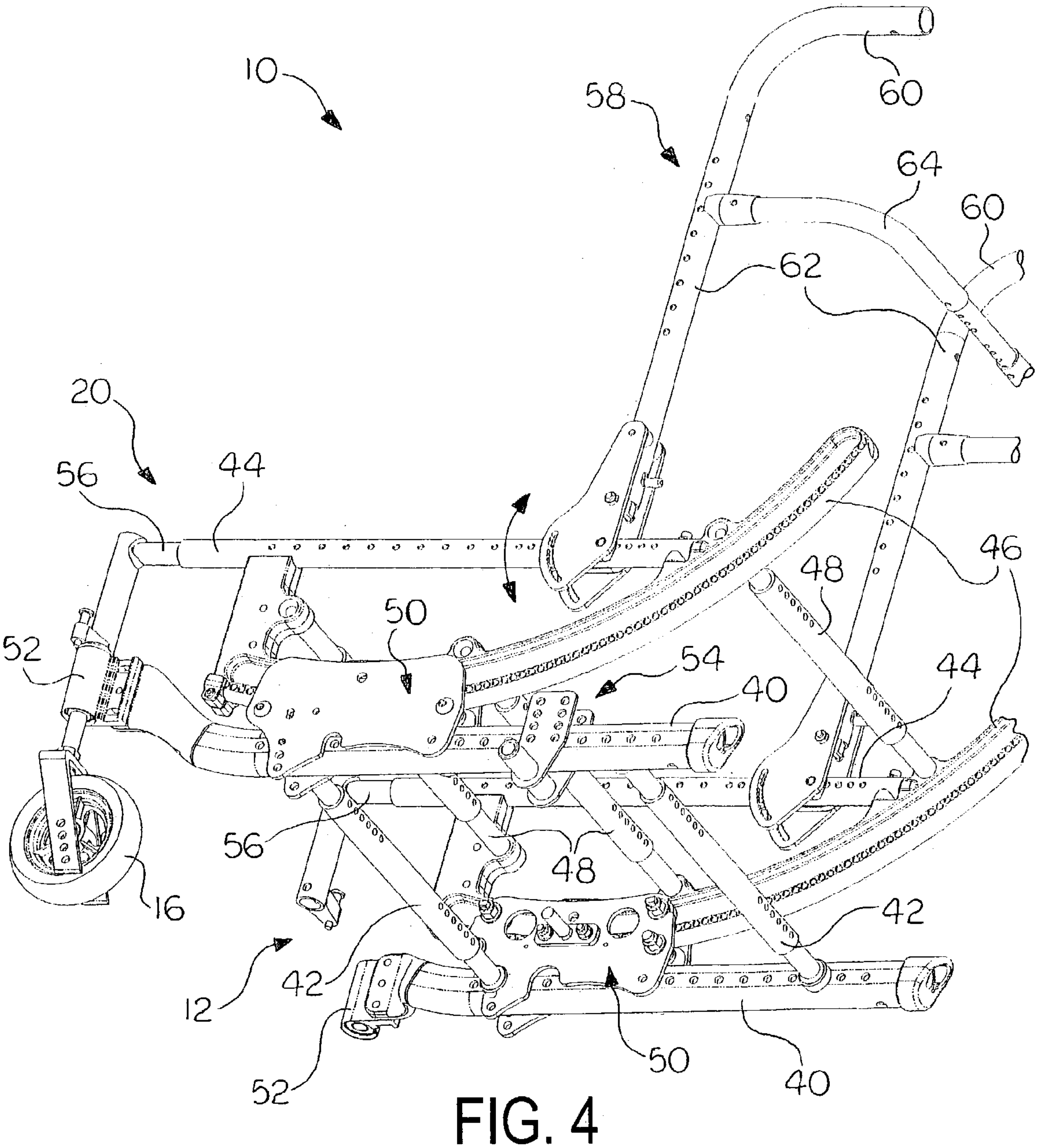
FIG. 4 is a bottom rear perspective view of the base frame and the seat frame shown in FIG. 3.

As illustrated in FIGS. 3 and 4, the base 12 includes a base frame (shown but not referenced), which is comprised of opposing side tubes 40 joined by a pair of longitudinally spaced, laterally extending tubes 42. It should be noted that the laterally extending tubes 42 are in the form of telescopic tubes that are adjustable relative to one another to permit the wheelchair 10 to grow in width. It should further be noted that the position of the laterally extending tubes 42 can be adjusted relative to the side tubes 40, for example, via the longitudinally spaced holes and fasteners (not shown).

The seat frame 20 is similarly comprised of opposing side tubes 44 and curved tracks or rockers 46 joined by a plurality of longitudinally spaced, laterally extending tubes 48. It should be noted that the laterally extending tubes 48 are in the form of telescopic tubes that are adjustable relative to one another to permit the wheelchair 10 to grow in width. The seat frame 20 is supported relative to the side tubes 40 by the rockers 46 via opposing low-friction support assemblies 50.

As shown in plain view, the side tubes 40 can support caster housings 52, which in turn are suitable for supporting the caster stems. The rear wheels 18 can be supported in a fixed relation to the side tubes 40 by any conventional means, including the axle mounting plate 54 shown.

The footrest assemblies 34 can include a tube 56 that is telescopically received by the side tubes 44. The tube 56 can be adjustable relative to the side tubes 44 to permit the longitudinal position of the tube 56 to be located in various fixed positions relative to the side tubes 44. This accommodates growth in the wheelchair 10 in a longitudinal direction.

It should be noted that an alternative seat back 58 is shown in FIGS. 3 and 4, wherein opposing handles 60 are provided on opposing canes 62. The handles 60 can be telescopically received in the canes 62. An additional assist handle 64 can extend rearward from the canes 62.

Figure 5:
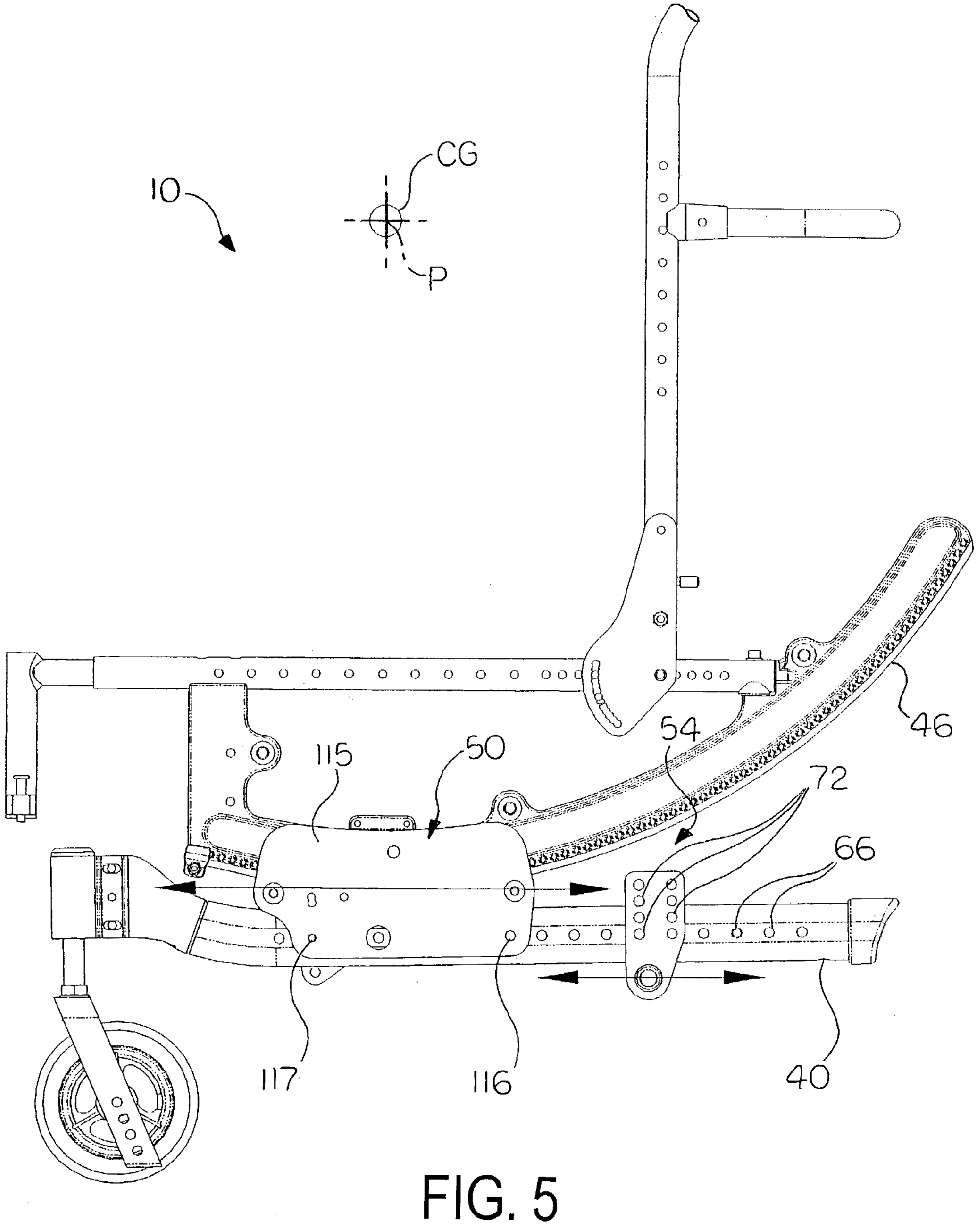
FIG. 5 is a side elevational view of a base frame and a seat frame with graphic designations indicating directional movement of a rocker support and axle mounting plate.

As depicted in FIG. 5, the low-friction support assemblies 50 and axle mounting plates 54 are adjustable in a longitudinal direction. This can be accomplished in any suitable manner. In the illustrated embodiment, the side tubes 40 can be provided with a series of longitudinally spaced holes 66. The low-friction support assemblies 50 and axle mounting plates 54 can each be provided with holes 116, 117, and 72 that are spaced and dimensioned to align with the holes 66 in the side tubes 40. Fasteners (not shown) are adapted to be secured in the aligned holes to hold the low-friction support assemblies 50 and axle mounting plates 54 in a fixed relation to the side tubes 40. To move the low-friction support assemblies 50 and axle mounting plates 54, simply remove the fasteners. The low-friction support assemblies 50 and axle mounting plates 54 can be moved longitudinally (i.e., in directions to the left and right when viewing FIG. 5). This permits the weight, as depicted at W in FIG. 6, of the wheelchair occupant to be adjusted longitudinally with respect to the wheelbase to optimize steering performance and stability. A preferred weight distribution is about 40 percent to the front casters 16 and 60 percent to the rear wheels 18. Such adjustment also permits the wheelbase to grow longitudinally to accommodate occupants of varying size.

Figure 6:
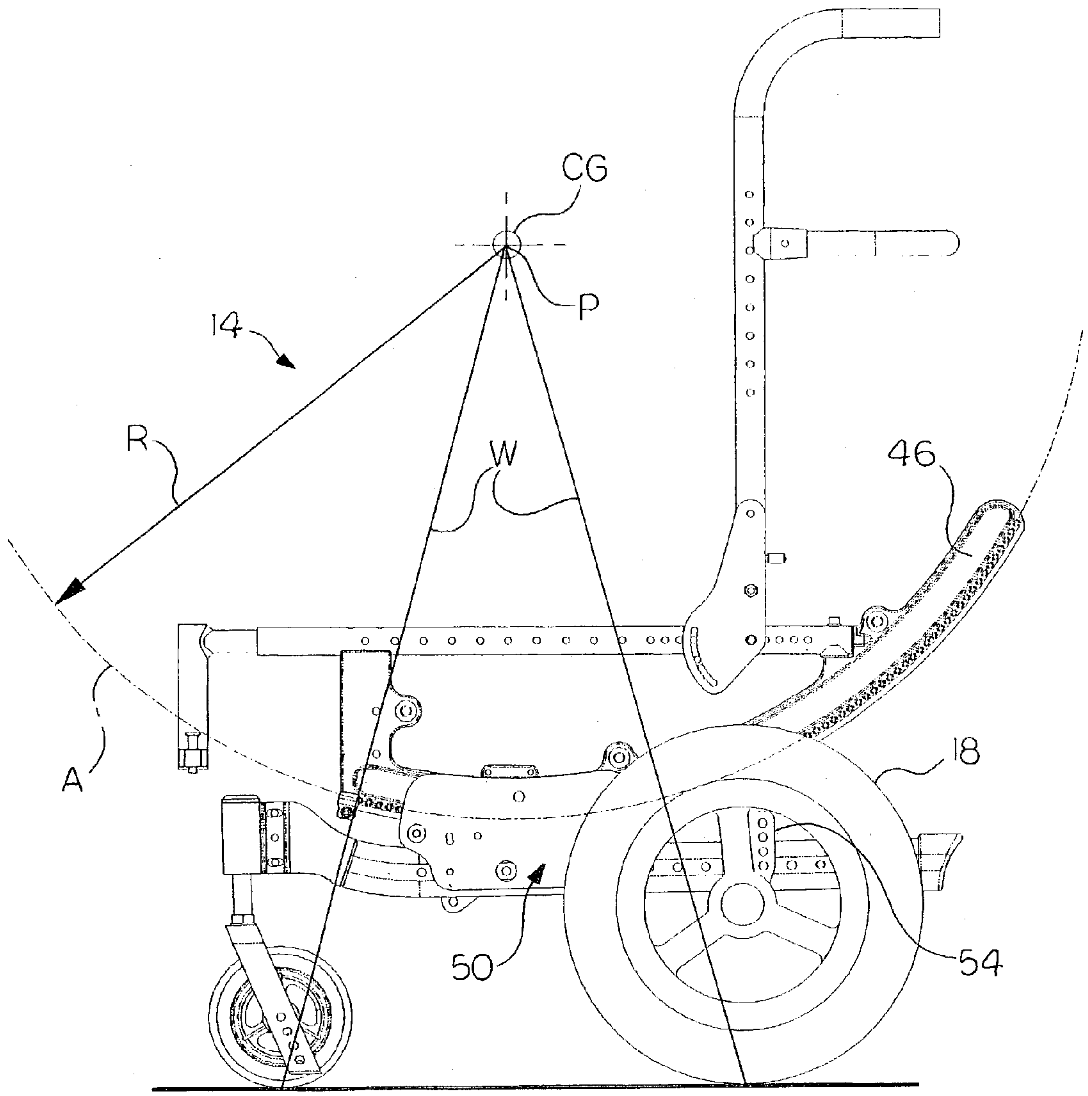
FIG. 6 is a partial side elevational view of the wheelchair with graphic designations indicating the focal point of the arc of a rocker, which is coincident with the center of gravity of a wheelchair occupant, and the weight distribution of the occupant to a supporting surface.

Continuing with FIG. 6, the arc A preferably has a constant radius R. The focal point P of the arc A is preferably coincident with the center of gravity CG of the wheelchair occupant. The constant radius arc A and the coincident focal point P and center of gravity CG are preferred so that the center of gravity CG remains fixed as the seat assembly 14 is tilted (i.e., as the seat assembly 14 is displaced in clockwise and counter-clockwise directions when viewing FIG. 6).

Figure 7:
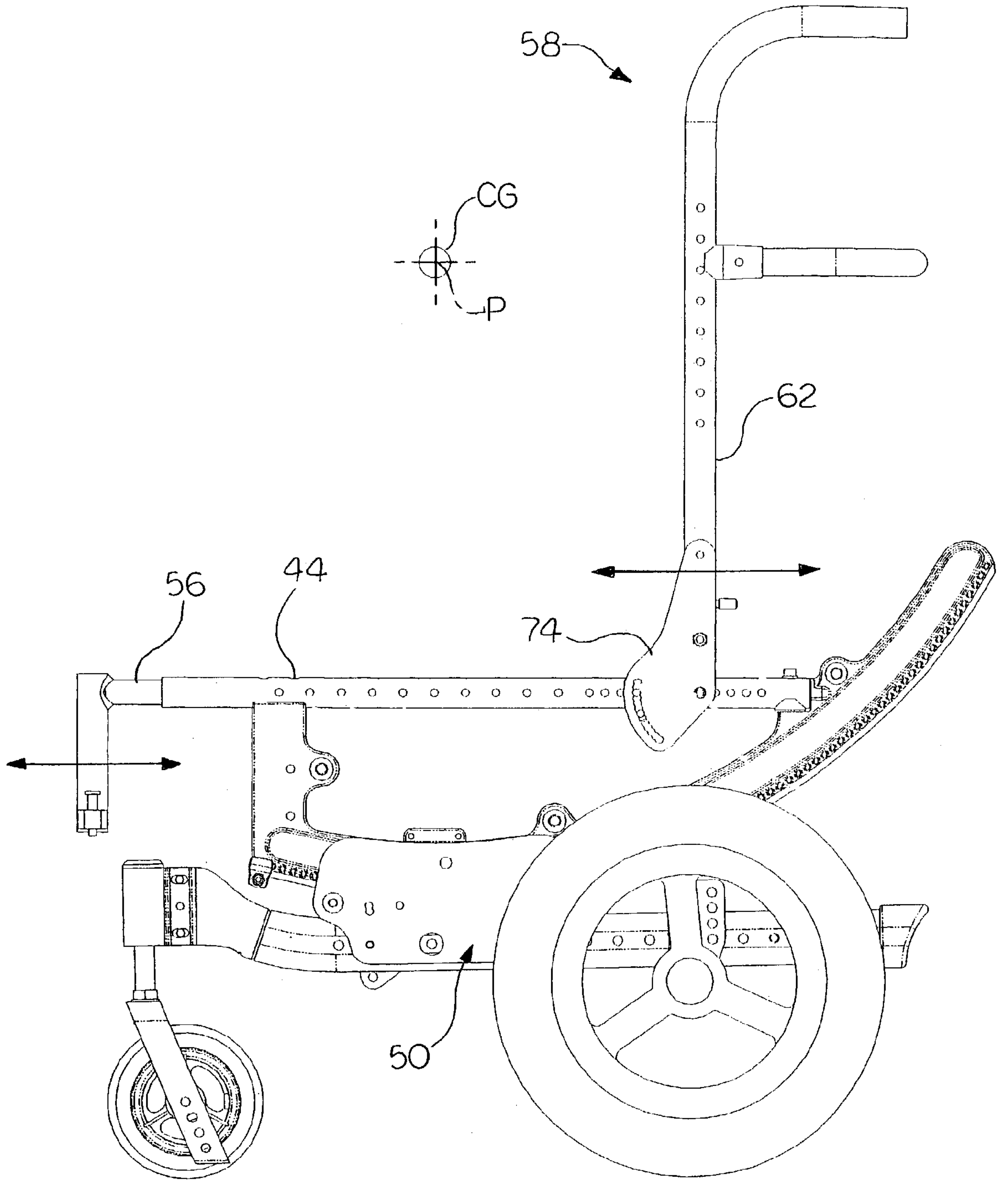
FIG. 7 is a partial side elevational view of the wheelchair with graphic designations indicating directional movement of a footrest assembly and seat back canes.

In FIG. 7, there are directional arrows (i.e., pointing to the left and right when viewing the drawing) that depict movement of the footrest assemblies 34 and the seat back canes 62 to permit the seating system to be adjusted for different size occupants.

The growth capability of these two components in two directions further enable adjustment such that the wheelchair occupant's center of gravity is maintained at the center of rotation or focal point P. This can be accomplished in any suitable manner. For example, the tubes 56 of the footrest assemblies 34 can be telescopically received by the side tubes 44 and the canes 62 can have couplings 74 that are attached for movement relative to the side tubes 44. The tubes 56 and the couplings 74 can have holes that are adapted to align with holes in the side tubes 44 of the seat frame 20.

Figure 8:
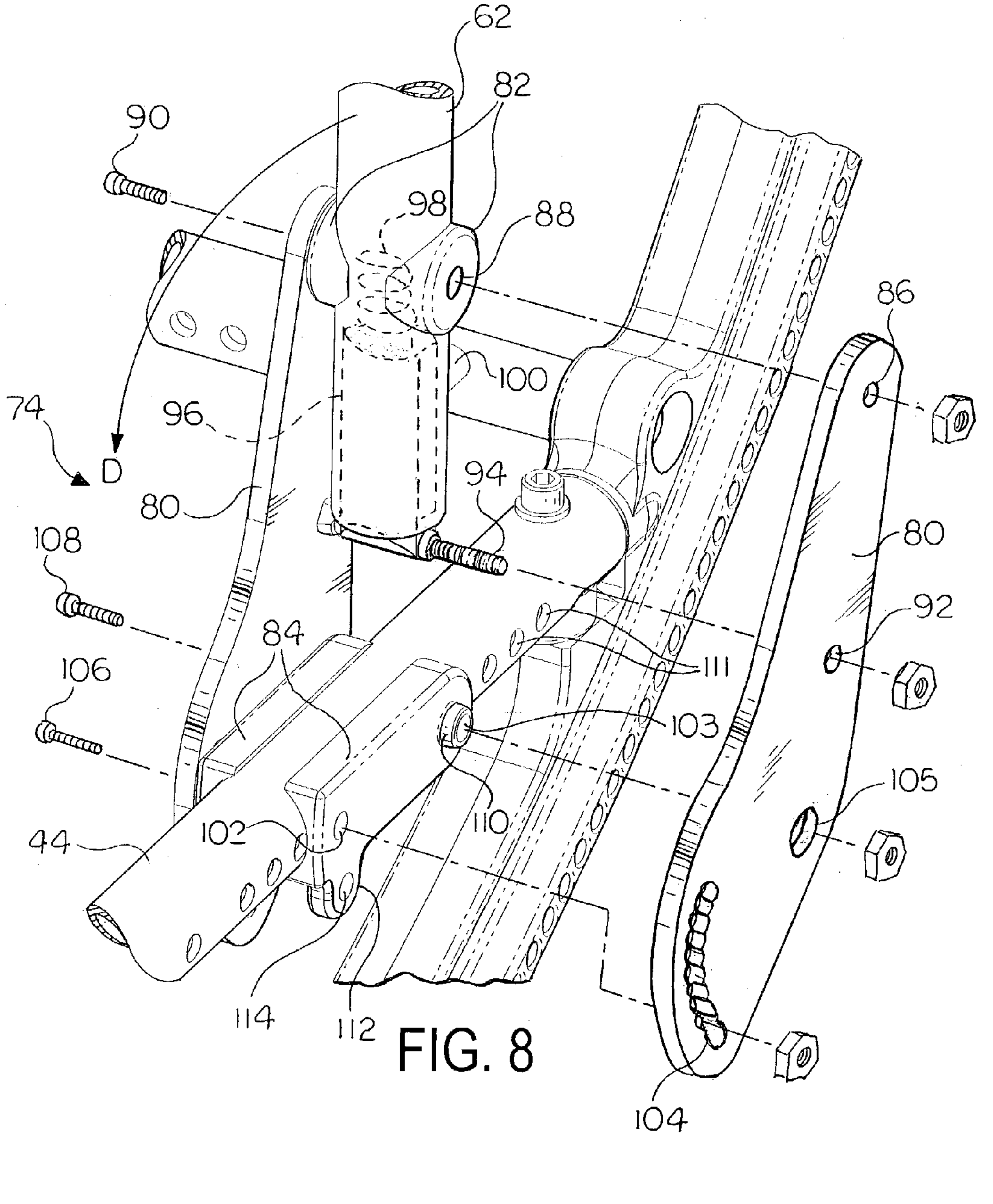
FIG. 8 is an enlarged front perspective view of a coupling for attaching the seat back to the seat frame.

The couplings 74 are structured to be adjustable with minimal disassembly. As shown in FIG. 8, the couplings 74 can include an assembly of plates 80 and saddles 82, 84. Upper ends of the plates 80 can be attached to the bottom of the canes 62 by cane saddles 82. Holes 86, 88 in the plates 80 and saddles 82 can align with holes (not shown) in the canes 62 to receive a fastener 90. This fastener 90 can form a pivot for the canes 62 to fold downward in the direction D relative to the side tubes 44 of the seat frame 20. Each plate 80 can have another hole 92 just below the bottom of the canes 62. These plate holes 92 can align with one another to receive another fastener 94. This fastener 94 can be selectively engaged by a piston 96 that is biased downward by a spring 98. A lever 100 extending rearward from the piston 96 can be displaceable to raise the piston 96 out of engagement with the fastener 94 to permit the canes 62 to be folded downward. Lower ends of the plates 80 can be attached to the side tubes 44 of the seat frame 20 by opposing elongate saddles 84. The lower ends of the plates 80 and the elongate saddles 84 can have aligning holes 102, 103 and 104, 105 for receiving fasteners 106, 108 for securing the plates 80 and elongate saddles 84 to the side tubes 44 of the seat frame 20. It should be noted that the elongate saddles 84 have bosses 110 extending laterally therefrom. The bosses 110 are coincident with the rear holes 103 in the saddles 84. The rear holes 105 of the plates 80 are preferably sized to receive the bosses 110. The upper fasteners 90, 94 hold the plates 80 together with the bosses 110 in the holes 105. The bosses 110 function as a pivot for adjusting the angle (i.e., the angle of recline) of the canes 62 relative to the side tubes 44 of the base frame 20. The lower fasteners 106, 108 are removable to permit the plates 80 and elongate saddles 84, together with the canes 62, to move longitudinally relative to the side tubes 44 of the seat frame 20.

As clearly illustrated, the holes 102, 103 in the elongate saddles 84 are adapted to align with holes 111 in the side tubes 44 of the seat frame 20. The fasteners 106, 108 can be received in any of the aligned holes to accommodate growth in the wheelchair 10 in a longitudinal direction and permit a wide range or variation in the positions of the footrest assemblies 34 and the low-friction support assemblies 50 to permit the wheelchair occupant to be positioned with his or her center of gravity CG substantially coincident with the arc A of the focal point P.

In FIG. 8, there are also illustrated tabs 112 extending downward from the elongate saddles 84. The tabs 112 have holes 114 extending laterally therethrough. The front holes 102 in the elongate saddles 84 and the holes 114 in the tabs 112 align with the holes 104, which are preferably an arcuate arrangement of scalloped holes, in the plates 80. The rear hole 105 in each plate 80 is the focal point of the arcuate arrangement. The front lower fastener 106 is adapted to be received through the front holes 102 in the elongate saddles 80 or the holes 114 in the tabs 112 and through any one of the scalloped holes 104. This permits the angle of the canes 62 to be adjusted relative to the side tubes 44 of the seat frame 20 to recline the canes 62.

The unique functionality of coupling 74 results from the use of elongate saddles 84. These saddles permit angular and longitudinal adjustment of the canes 62 and plates 80 with greater ease than conventional coupling systems that perform a similar function. For both angular and longitudinal adjustment, the upper fasteners 90, 94 remain intact with plates 80 and saddles 82.

Angular adjustment only of the cane 62 and plates 80 about the seat tube 44, as illustrated in coupling 74, is accomplished by merely completely removing the front lower fastener 106 and then slightly loosening the back lower fastener 108 to reduce the clamping pressure of the plates 80 on the saddles 84 and the side tubes 44. The canes 62 and plates 80 can then freely rotate coincidentally about the rear plate holes 105 and rear saddle holes 103.

Longitudinal adjustment of the canes 62 and plates 80 of the illustrated coupling 74, can be accomplished by removing only the front and back lower fasteners 106, 108. No other parts require removal nor are free to loosen or drop out during this adjustment because the back lower holes 105 in the plates 80 are coincidentally engaged about the bosses 110 of the saddles 84 and the plates 80 maintain a pre-load against the saddles 84 and side tube 44 due to the installed clamping force of upper fasteners 90, 94 so that the plates 80 remain engaged with the saddles 84. When the desired longitudinal location of the canes 62 along side tube 44 is established, the front and back lower fasteners 106,108 are re-installed and secured in place.

It should be noted, that during longitudinal adjustments, pre-established angular settings of the canes 62 and plates 80 can be preserved by first removing the back rear fastener 108 from the holes 103, 105 in the saddles 84 and plates 80 and then placing the back rear fastener 108 completely through the holes 114 in the saddle tabs 114 and the scalloped holes 104 in the plates 80. The back rear fastener 108 is now in a shear mode that maintains the angular position of the cane 62 and the plates 80. Next, by removing front lower fastener 106, the entire assembly (i.e., the cane 62 and the plates 80) is free to translate longitudinally along side tube 44.

Figure 9:
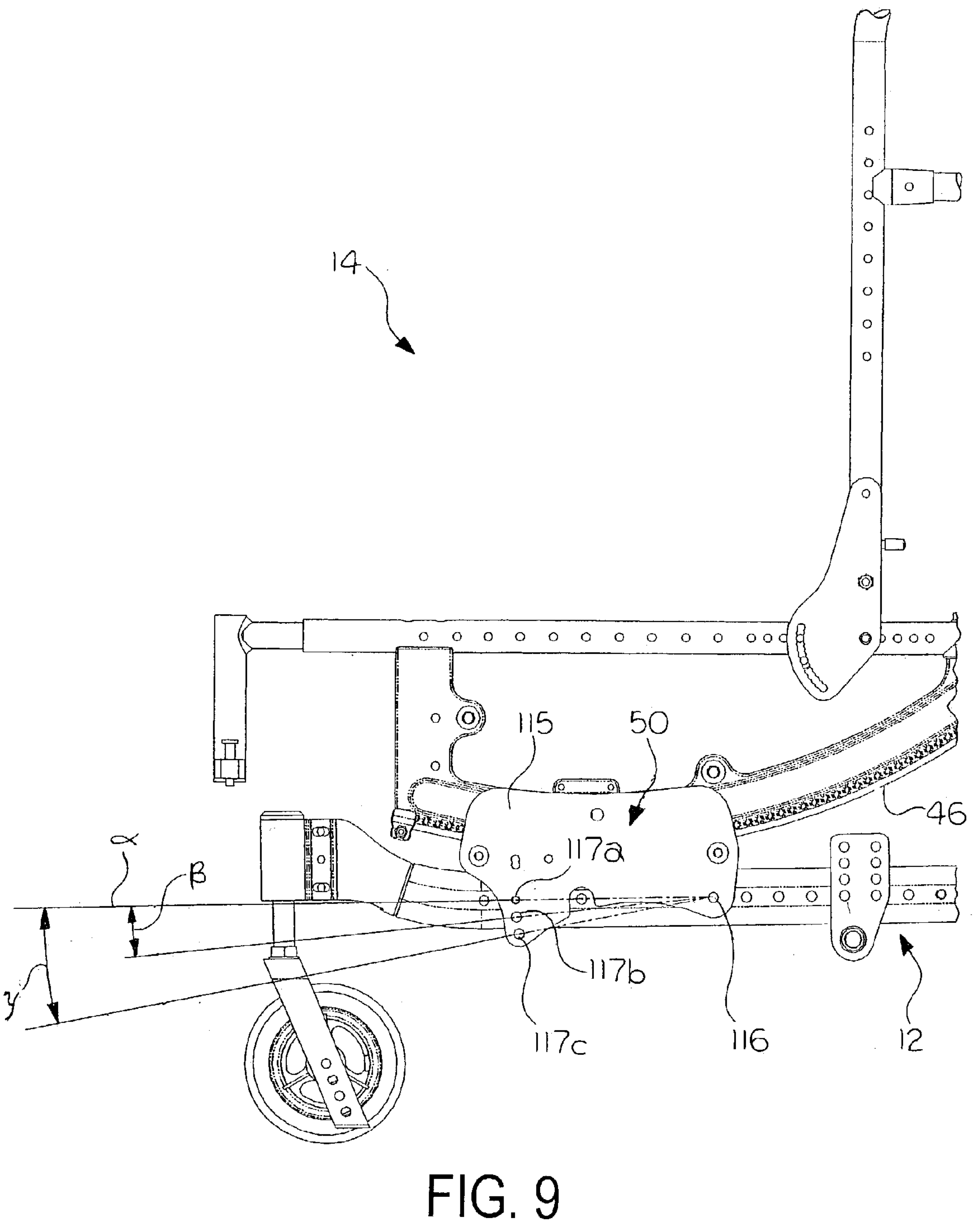
FIG. 9 is a partial side elevational view of the wheelchair with graphic designations indicating an adjustment in the angle of the rocker support.

In FIG. 9, there is illustrated an example of a structure for adjusting the angle of the rockers 46. It should be appreciated that the structure is provided for illustrative purposes and that other structures could be used for carrying out the invention. The structure shown is supported by the low-friction support assemblies 50. As shown, the low-friction support assemblies 50 have one or more side plates 115 each having a first mounting hole 116 therein and a plurality of spaced apart angle adjustment holes **117*a*, 117*b*, 117*c* in spaced relation to the first mounting hole 116. The first mounting hole 116 in combination with one of the angle adjustment holes 117***a*, 117*b*, 117*c* supports the seat assembly 14 at a fixed angle relative to the base 12 and in relation to the other angle adjustment holes 117*a*, 117*b*, 117*c*. For example, the first mounting hole 116 and a first one of the angle adjustment holes 117*a* support the low-friction support assembly 50 at an angle a, which is about zero degrees relative to the side tubes 40. The first mounting hole 116 and a second one of the angle adjustment holes 117*b* support the low-friction support assembly 50 at an angle β, which is about five degrees relative to the side tubes 40. The first mounting hole 116 and a third one of the angle adjustment holes 117*c* support the low-friction support assembly 50 at an angle γ, which is about ten degrees relative to the side tubes 40. It should be clearly understood that these three angular adjustments affect the tilt range of the seat assembly 14.

Figure 10:
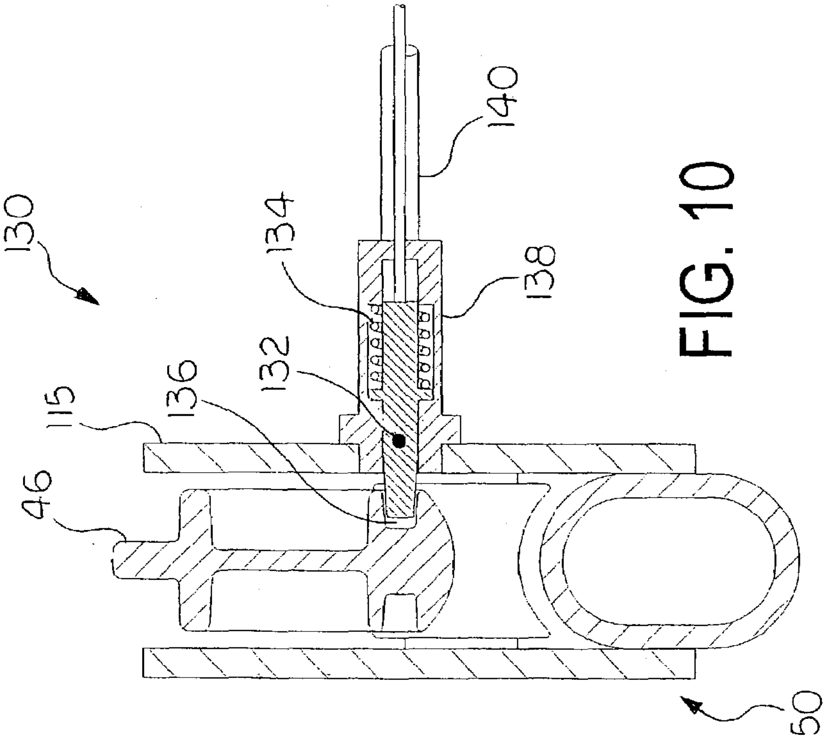
FIG. 10 is an enlarged-scale sectional view in elevation of a lock assembly for locking the rocker in relation to the rocker support.

In FIG. 10, there is illustrated a lock assembly 130 for locking the rockers 46 in relation to the low-friction support assemblies 50. The lock assembly 130 is supported by the inner plate 115 and includes a protrusion that engages any one of a plurality of recesses in the rockers 46. In the illustrated embodiment, a plunger pin 132 is biased by a spring 134 into engagement with any one of a plurality of holes 136 in rockers 46. The plunger pin 132 and the spring 134 can be housed in a housing 138 that is threaded, pressed, or otherwise held in a fixed relation to a hole in the inner plate 115 of the low-friction support assemblies 50. The plunger pin 132 can be actuated by a cable 140, which can be controlled by a conventional lever (i.e., the levers 154 shown in FIG. 12) supported on one of the handles 60 of the seat back 58.

Figure 11:
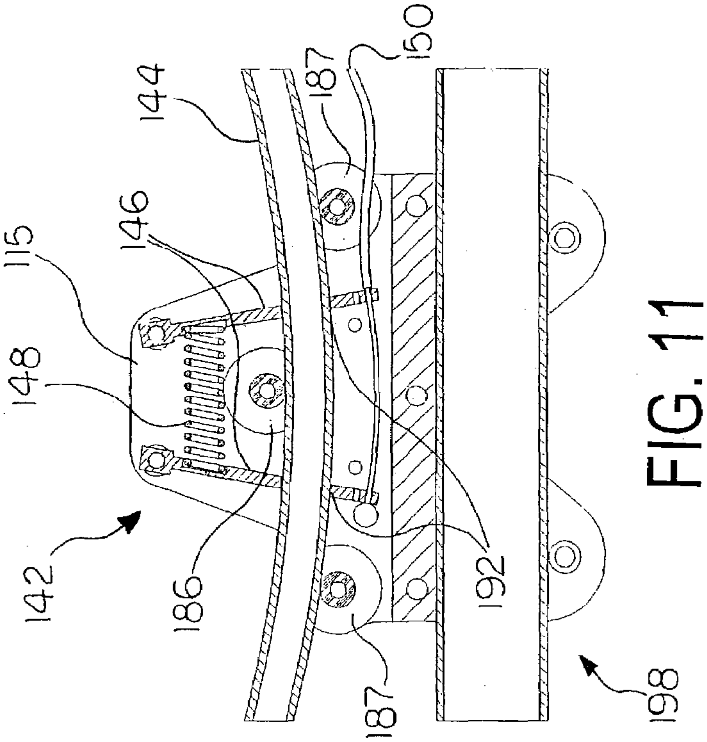
FIG. 11 is an enlarged sectional view in elevation of an alternative lock assembly.

An alternative lock assembly 142 is illustrated in FIG. 11. This lock assembly 142 would be suitable for use with a track, such as the rocker 144 shown, which is tubular and round in cross-section. The lock assembly 142 includes a pair of locking plates 146 that are held in spaced relation by a spring 148. The spring 148 is attached for movement relative to the side plates 115 of the low-friction support assemblies 50. The spring 148 biases the locking plates 146 outward in opposing directions (i.e., in the left and right directions when viewing FIG. 10) and into engagement with the rocker tube 144 to prevent the rocker tube 144 from moving relative to the locking plates 146. Note that an actuator cable 150 can extend through the locking plates 146 and control the locking plates 146 to move the locking plates 146 out of engagement with the rocker tube 144 to permit the rocker tube 144 to move.

Figure 12:
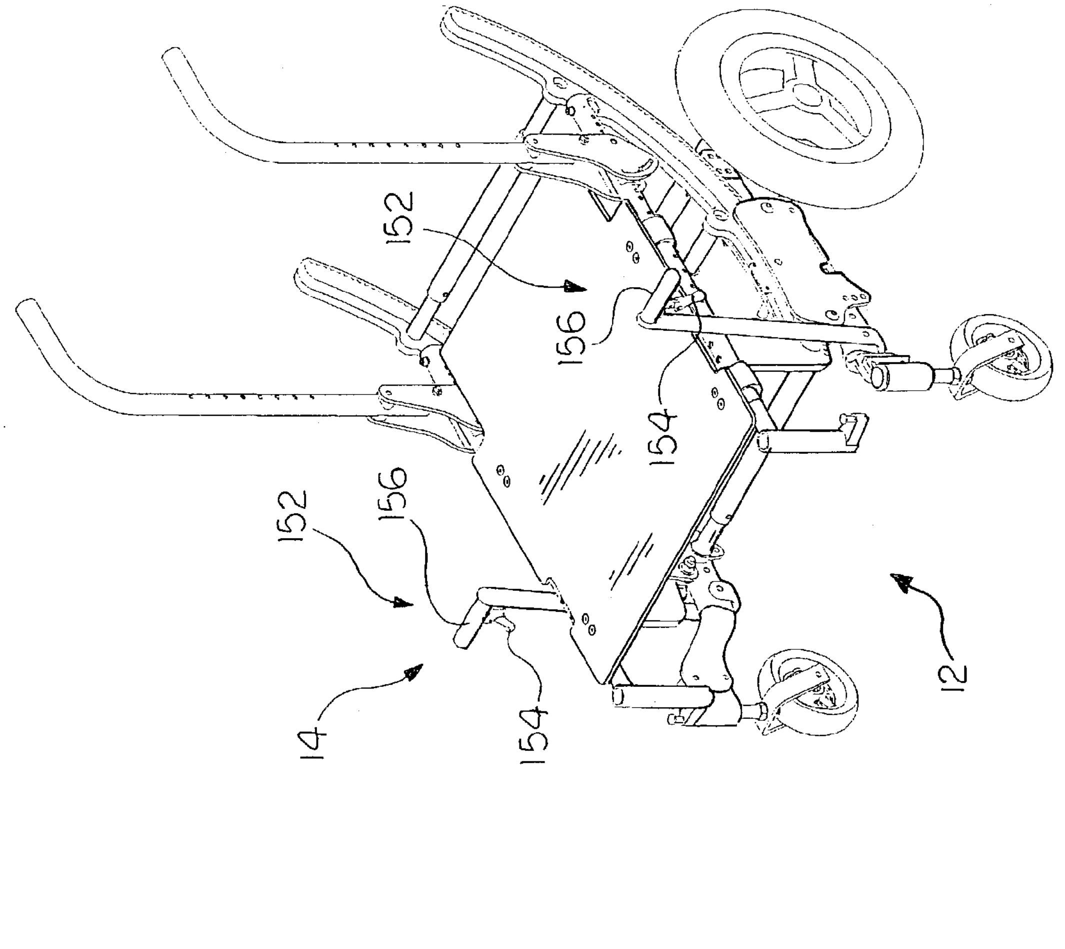
FIG. 12 is a reduced-scale front perspective view of a wheelchair according to an alternative embodiment of the invention with handle assemblies that permit control and displacement of the seat frame by the wheelchair occupant.

In FIG. 12, there is illustrated a wheelchair having handles 152 with supporting levers 154 for actuating the cables for controlling the rocker locking assemblies, such as the locking assemblies described above. The handles 152 are also provided with handholds 156 to enable the wheelchair occupant to tilt his or herself in the seat assembly 14 relative to the base 12.

Figure 13:
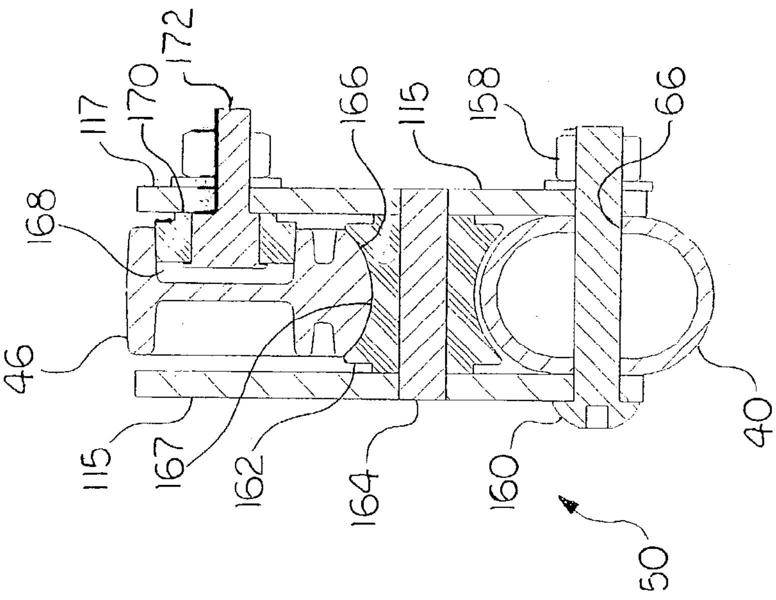
FIG. 13 is an enlarged-scale sectional view in elevation of the base frame, rocker support, and rocker.
Figure 14A:
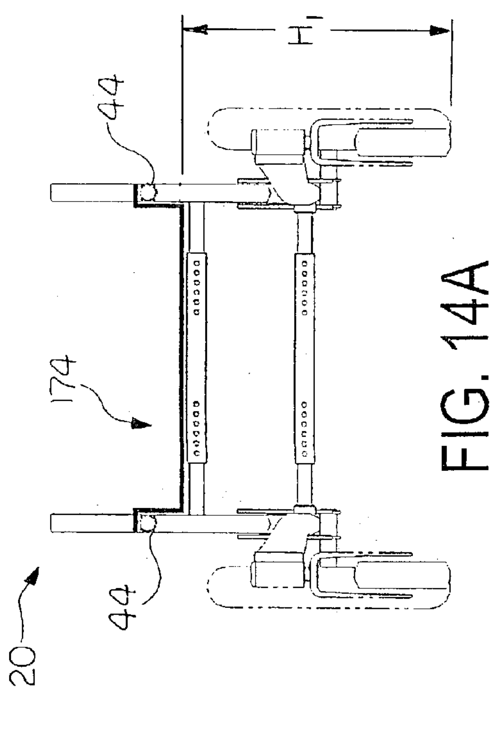
FIGS. 14A and 14B are reduced-scale partial front and side elevational views of the wheelchair with a drop seat configuration.
Figure 14B:
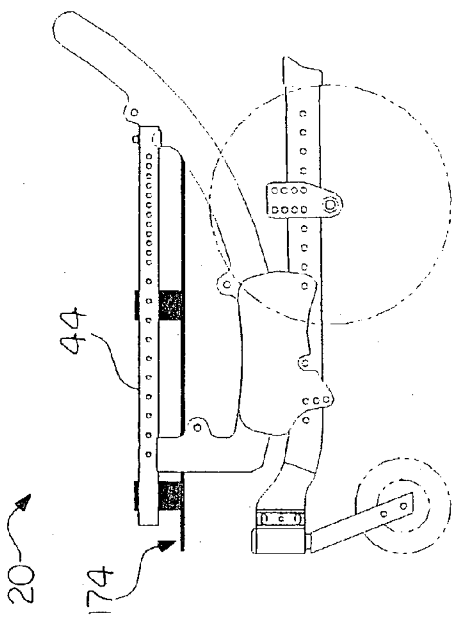
Figure 15A:
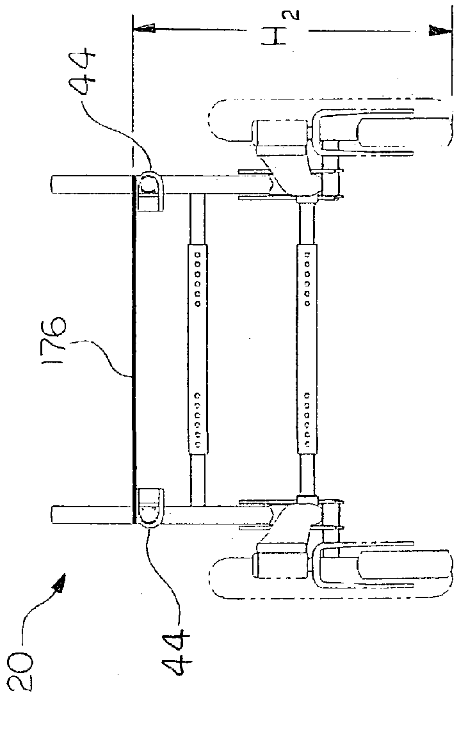
FIGS. 15A and 15B are reduced-scale partial front and side elevational views of the wheelchair with a standard seat configuration.
Figure 15B:
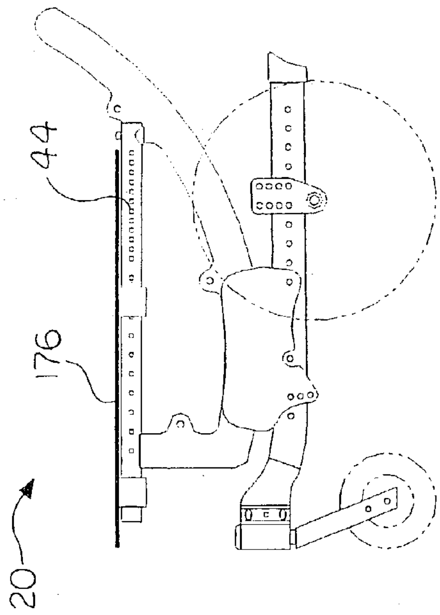
Figure 16B:
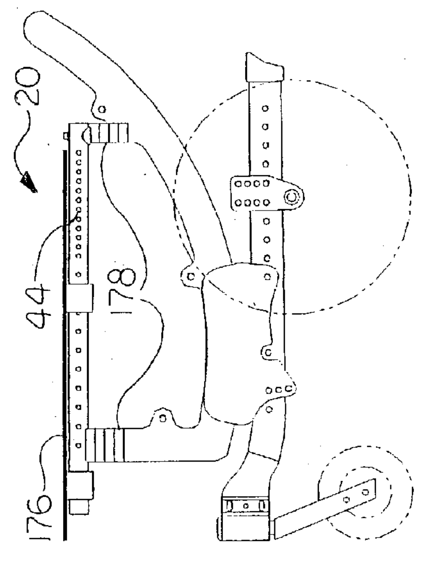
FIGS. 16A and 16B are reduced-scale partial front and side elevational views of the wheelchair with a standard seat configuration with spacers elevating the seat.
Figure 17B:
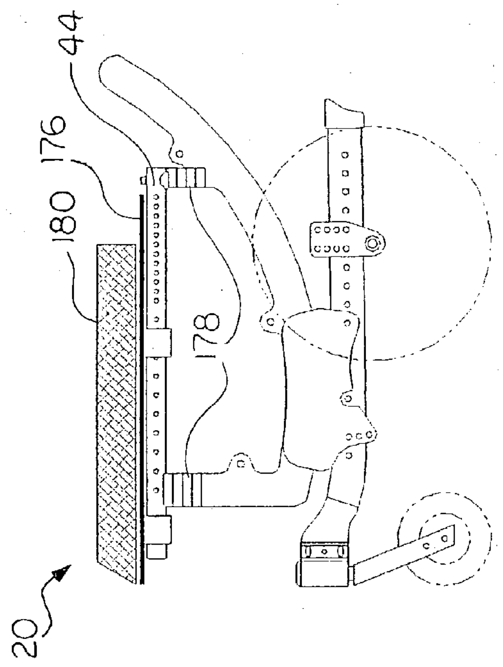
FIGS. 17A and 17B are reduced-scale partial front and side elevational views of the wheelchair with a standard seat configuration with spacers elevating the seat and a cushion supported by the seat.
Figure 16A:
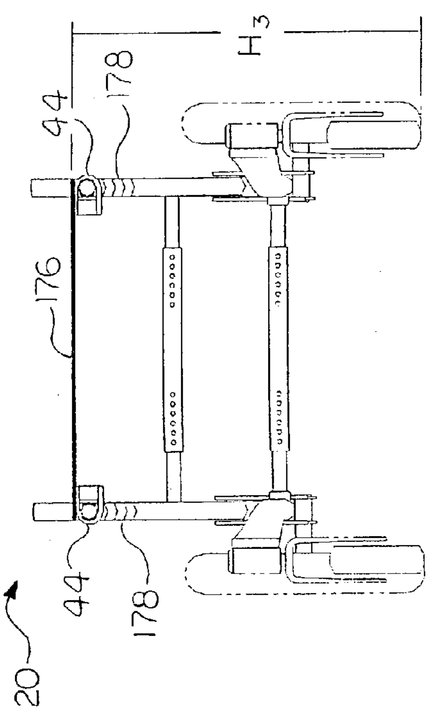
Figure 17A:
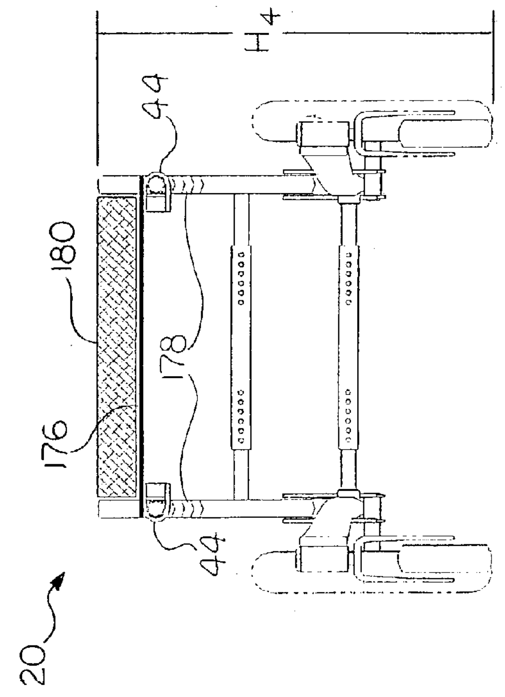

In FIG. 13, there is illustrated a sectional view of a side tube 40 of the base 12, a rocker 46 of the seat assembly 14, and a low-friction support assembly 50 supporting the rocker 46 relative to the side tube 40. In accordance with the illustrated embodiment, the side tube 40 of the base 12 is situated between the side plates 115 of the low-friction support assembly 50. As stated above, the side plates 115 are attached to the side tube 40 by fasteners, such as the bolt 160 shown, that pass through holes 66 (also shown in FIG. 5) in the side tube 40 that align with corresponding holes in the side plates 115. A bottom roller 162 is supported for movement above the side tubes 40 by an axle 164. The bottom roller 162 is supported in spaced relation to the side tubes 40. The rocker 46 has a contact surface 166 that engages the bottom roller 162. The rocker 46 and the bottom roller 162 preferably have mating surfaces, such as the rounded contact surface 166 of the rockers 46 and the saddle shaped surface 167 of the bottom roller 162. The rocker 46 further has an arcuate shaped relief 168 in a side thereof. The arc of the relief 168 has a constant radius that is coincident to the saddle shaped surface 167. A top roller 170 engages the relief 168 to trap a portion of the rocker 46 against the bottom roller 162. The top roller 170 is preferably supported by an adjustable eccentric cam bolt 172. It should be appreciated that the relief 168 and the top roller 170 can include mating surfaces that engage one another with a force the depends upon the position of the eccentric cam bolt 172. It should be appreciated that the instant invention is not intended to be limited to the rollers 162, 170 set forth above but can be practiced with other low friction elements, such as, and the like As shown in FIGS. 14A through 17B, the seat assembly 14 is adapted to support a variety of seats. The seat 174 illustrated in FIGS. 14A and 14B is a drop seat, which is adapted to be supported below the side tubes 44 of the seat frame 20 so that the height $H_1$ of the seat 174 is minimized. The seat 176 illustrated in FIGS. 15A and 15B is a standard seat, which is adapted to be supported atop the side tubes 44 of the seat frame 20 so that the height $H_2$ of the seat 176 is substantially the same as the height of the side tubes 44. The seat 176 illustrated in FIGS. 16A and 16B is a standard seat, which is adapted to be supported above the side tubes 44 of the seat frame 20 by spacers 178 so as to raise the side tubes 40 and the seat 176 to a greater height $H_3$. It should be quite clear that the height $H_3$ is dependent on the size and number of spacers 178 used. The seat 176 illustrated in FIGS. 17A and 17B is a standard seat similar to that shown in FIGS. 16A and 16B, further supporting a cushion 180, which is elevated to a greater height $H_4$ above the side tubes 44. The aforementioned seats 174, 176 and spacers 178 are adapted to be attached in any suitable manner. These and other seats can be supported by the seat assembly 14. The importance of the above mentioned seat height adjustments is that it enables vertical positioning of the occupant's center of gravity to be coincident with center of curvature or focal point P of the rocker 46.

Figure 18B:
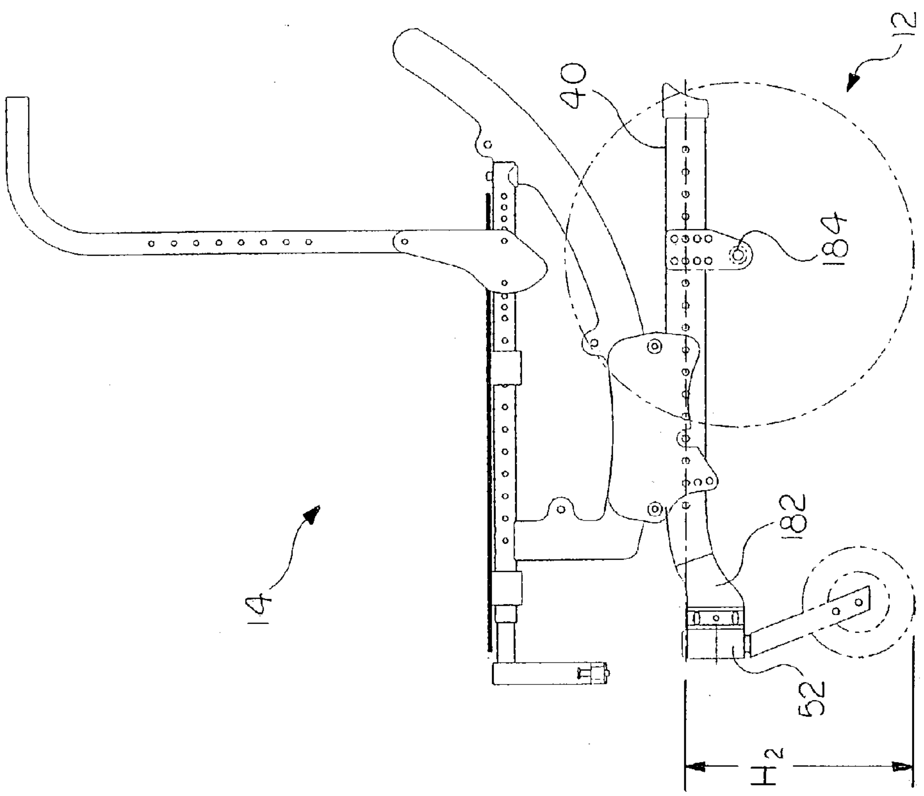
FIGS. 18A and 18B are reduced-scale partial side elevational views of the wheelchair with the base frame in "up" and "down" positions.
Figure 18A:
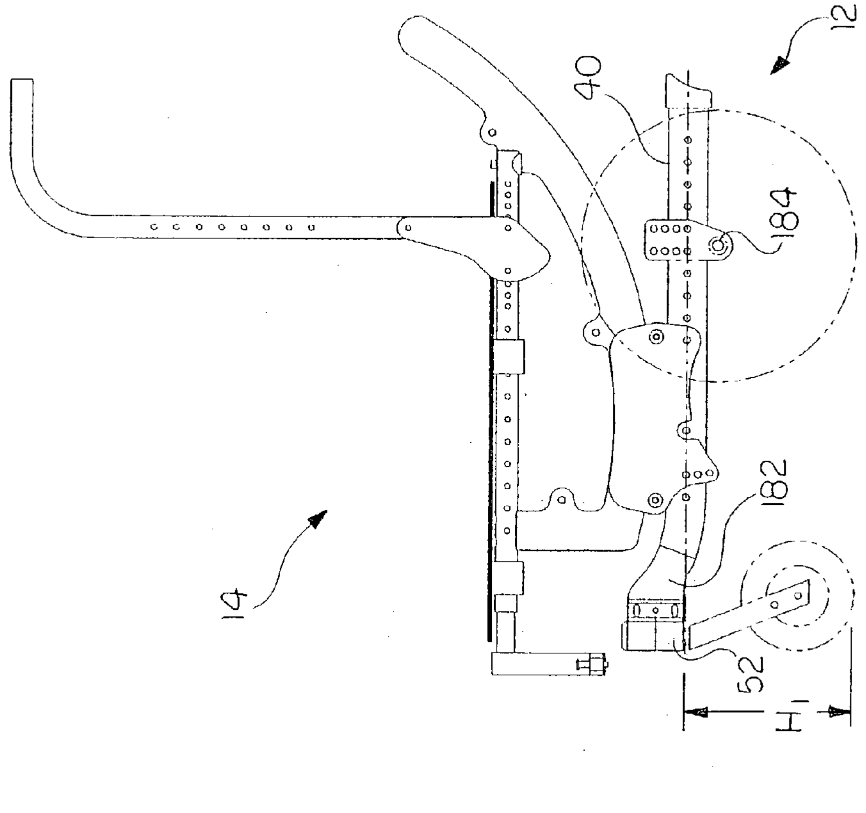

In FIGS. 18A and 18B, there are illustrated means for adjusting the height of the caster housings 52. The adjusting means can be any suitable adjusting means including but not limited to an offset 182, as shown at the front end of the side tubes 40 of the base 12. As shown in FIG. 18A, the offset 182 can be directed up to minimize the height $H_1$ of the seat assembly 14. In FIG. 18B, the offset 182 can be directed down to maximize the height $H_2$ of the seat assembly 14. Also note the change in the position of the axle sleeve 184 relative to the side tubes 40 of the base 12 in the two drawings. The close proximity of the axle sleeve 184 to the side tubes 40 lowers the rear of the seat assembly 14. The converse holds true if the axle sleeve 184 is moved down and away from the side tubes 40. That is, the rear of the seat assembly 14 is raised accordingly.

Figure 19B:
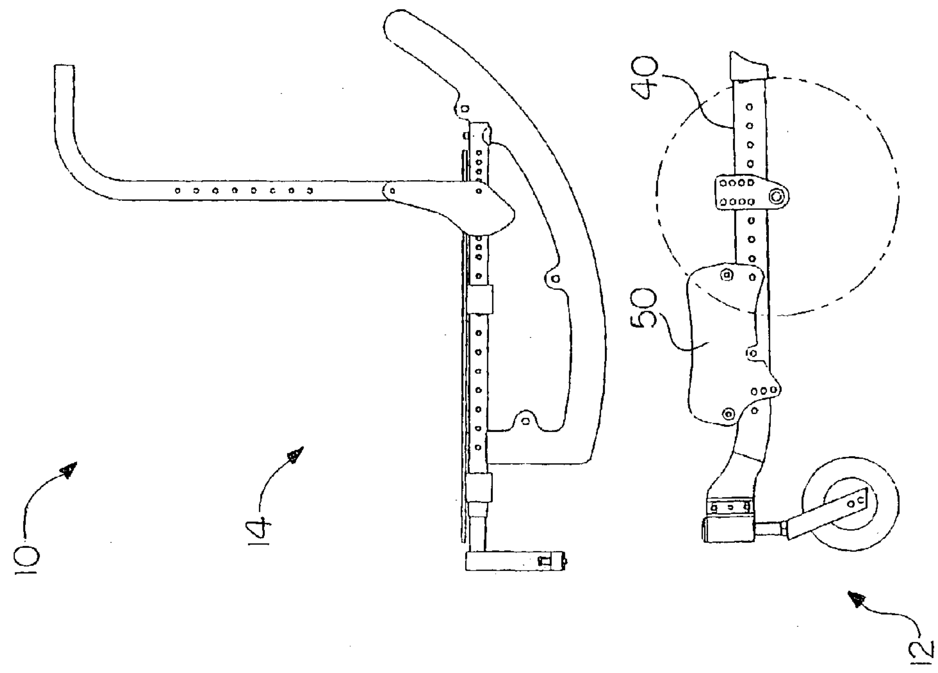
FIGS. 19A and 19B are reduced-scale partial side elevational views of alternative means for removing the seat.
Figure 19A:
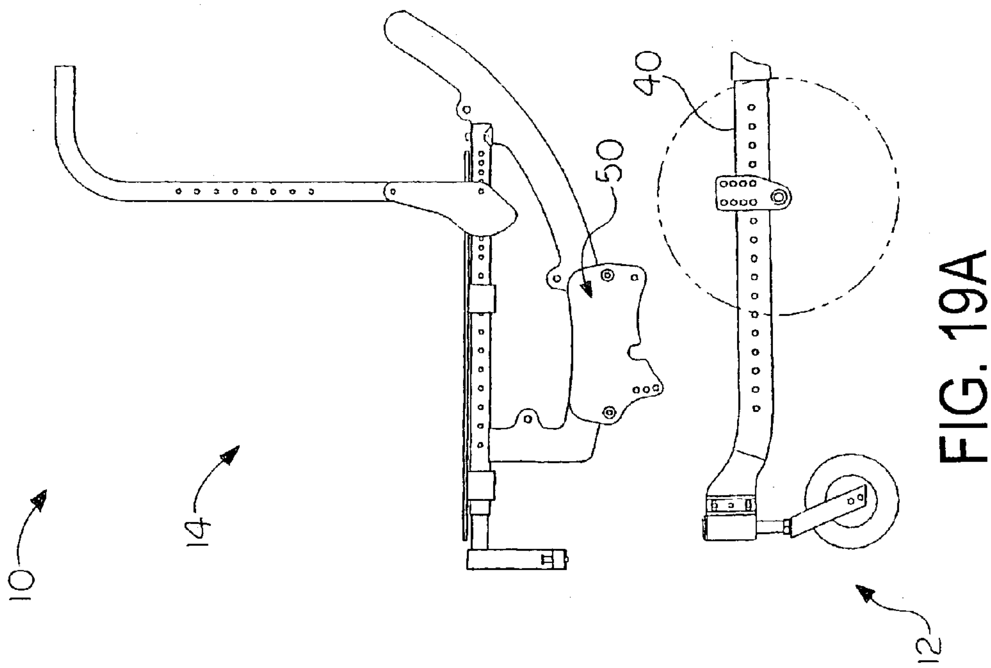

As illustrated in FIGS. 19A and 19B, the seat assembly 14 can be removed from the base 12. This can be accomplished in any suitable manner. For example, the low-friction support assemblies 50 can be releasably attached (i.e., preferably readily removable with or without the aid of tools) to the side tubes 40 of the base 12 so that the low-friction support assemblies 50 and thus the seat assembly 14 can be easily removed from the base 12, as shown in FIG. 19A, for ease in transporting the wheelchair 10. Alternatively, the seat assembly 14 can be releasably attached to the low-friction support assemblies 50 so that the seat assembly 14 can be easily removed from the low-friction support assemblies 50, as shown in FIG. 19B. One of ordinary skill in the art of the invention, without undue experimentation, could provide suitable means for releasably attaching the seat assembly 14, including a variety of quick-release fasteners.

It should be noted that the wheelchair 10 comprises two primary parts: the base 12 and the seat assembly 14. The seat assembly 14 includes the seat frame 20, the seat back 22, 58, and the footrest assembly 34, all rigidly supported on the rockers 46. The low-friction support assemblies 50 capture the rockers 46 and constrain the motion of the seat frame 20 to pure rotation about the rocker's center of curvature (i.e., focal point P).

In a preferred embodiment, four bottom rollers 162 (i.e., two rollers 162 per rocker 46) preferably support the underside surface of the rockers 46. These rollers 162 are saddle-shaped to position the rockers 46 along the center of the support assembly 50. The rockers 46 have a similarly shaped profile that fits within the saddle-shaped rollers 162. These mating shapes serve to align the rockers 46 with the rollers 162.

Four top rollers 170 (i.e., two top rollers 170 per track) preferably contact the upper curved surface of the rockers 46, capturing the rockers 46 and preventing the rockers 46 from lifting off the base 12. The top and bottom rollers 162, 170 allow the seat frame 20 to rotate with minimal friction about the center of curvature P of the rockers 46.

It should further be noted that the holes 136, which serve as the engagement features for the spring-loaded plunger pins 132, can be equally spaced and arranged in a series between the upper and lower surfaces of the rockers 46, along an arc concentric with the curvature of the rockers 46. The holes 136 can be spaced discrete angular distances apart, such as one-degree apart, to permit precise incremental adjustments in the tilt angle. Multiple pins 132 could engage multiple holes 136 of the rockers 46 to reduce sheer forces encountered by the pins 132 when locking the rocker 46 in position. It should be clearly understood that the tilt angle of the seat frame 20 can be changed by simply squeezing levers to release the pins 132 from the holes 136 and rotating the seat frame 20 by pushing or pulling on handles. When the levers are released, the pins 132 engage with the closest aligned holes 136, locking the seat frame 20 with respect to the base 12 at a specific tilt angle.

In order for the wheelchair 10 to function as intended, a wheelchair occupant's center of gravity CG should coincide closely with the center of curvature of the rockers 46. To this end, the wheelchair occupant should be properly positioned at the center of curvature of the rockers 46. The wheelchair 10 incorporates several means for adjusting the position of the wheelchair occupant to align the occupant's center of gravity CG with the center of curvature of the rockers 46. The seat back 22, 58, the seat 24 (e.g., a pan, a sling, etc.), and the footrest assemblies 34 all preferably incorporate fore/aft adjustability with respect to the center of curvature. Couplings that secure the canes 26, 62 and seat 24 to the seat frame 20 allow for fore/aft adjustability. The tubes 56 supporting the footrest assemblies 34 also have fore/aft adjustability. This adjustability allows proper center of gravity CG alignment for a range of wheelchair occupant sizes and accommodates occupant growth.

The center of curvature of the rockers 46 is a virtual point in space that typically resides close to the occupant's abdomen. Because the pivot point in this design is a virtual point in space, and not a physical pivot axis near the abdomen, the wheelchair occupant is not confined by hardware or the wheelchair structure that surrounds the occupant. The absence of any wheelchair structure at this location is advantageous because the seating area remains unconfined. This assists in transferring the occupant in and out of the wheelchair.

Proper positioning of the center of gravity CG of a wheelchair occupant with respect to the base 12 is important for stability and maneuverability of the wheelchair. Stability is ensured when the center of gravity CG is properly positioned between the front casters 16 and rear wheels 18 attached to the base frame 12. Increased maneuverability is achieved when the rear wheels 18 support a larger portion of an occupant's weight. Reducing the weight on the front casters 16 produces easier steering and facilitates lifting the front end of the wheelchair when crossing thresholds. Because the wheelchair 10 is intended to cover a wide range of occupant sizes, the wheelchair footprint (i.e., the distance between the front casters 16 and the rear wheels 18) can grow.

The wheelchair 10 incorporates several unique features to maintain stability and maneuverability while accommodating a wide range of occupant sizes. The seat frame 20 can be adjusted fore/aft with respect to the base 12. The seat frame 20 can be positioned with respect to the base 12 by moving the support assembly 50 fore/aft along the base 12. The rear wheels 18 may be positioned fore/aft along the base 12 as well. This ability to adjust the size of the wheelchair footprint and position the occupant's center of gravity CG fore/aft within this footprint allows the wheelchair to be properly configured for stability and maneuverability over a wide range of occupant sizes.

The support assembly 50 can be mounted on the base 12 in three different angular positions. These positions allow the range of tilt to be changed to accommodate a particular wheelchair occupant's needs. The first position allows the seat assembly 14 to tilt in a range of about 5° anterior to about 50° posterior. The second position allows the seat assembly 14 to tilt in a range of about 0° to about 55° posterior. The third position allows the seat assembly 14 to tilt in a range of about 5° posterior to about 60° posterior. An increased posterior tilt range provides more pressure relief to the ischial tuberosities. An increased anterior tilt range assists in transferring the wheelchair occupant in and out of the wheelchair 10 and allows a occupant to foot propel. These three tilt ranges allow the tilt range to be customized to a particular occupant's needs.

The rocker 144 according to the alternative embodiment of the invention is in the form of a round steel tubing, as partially shown in cross-section in FIG. 11. The rocker 144 is formed into a constant radius curve. This rocker 144 serves the same function as the rocker 46 according to the preferred embodiment of the invention. The rocker 144 is attached to the seat frame 20 at its ends. The rocker 144 is secured to the support assembly 50 by a plurality of rollers, two rollers above the rocker 144, although only one roller 186 is shown in the illustrated embodiment, and two rollers 187 below. The tilt angle is fixed by the alternative lock assembly 142, which is located within the support assembly 198. The locking plates 146 have holes 192 through which the rocker 144 passes. These holes 192 are slightly oversized with respect to the diameter of the rocker 144. The plates 146 pivot about their upper ends. The spring 148 situated between the plates 146 forces the plates 146 to pivot away from one another and cam against the rocker 144 to lock the rocker 144 in place with respect to side tube 40 of the base 12. This secures the tilt angle of the seat frame 20. The plates 146 oppose one another so that, when the seat frame 20 is tilted in one direction, the trailing plate in the direction of travel of the rocker 144 cams against the rocker 144 and prevents the seat frame 20 from tilting. The cable 150 is preferably a lever-operated cable that is secured across the plates 146 so that, when the lever (not shown) is squeezed, the plates 146 pivot towards one another. As the plates 146 pivot toward one another, the axes of the holes 192 within the plates 146 align with the arc of the rocker 144 and release the rocker 144 to allow the rocker 144 to slide freely as the seat frame 20 tilts.

Figure 20:
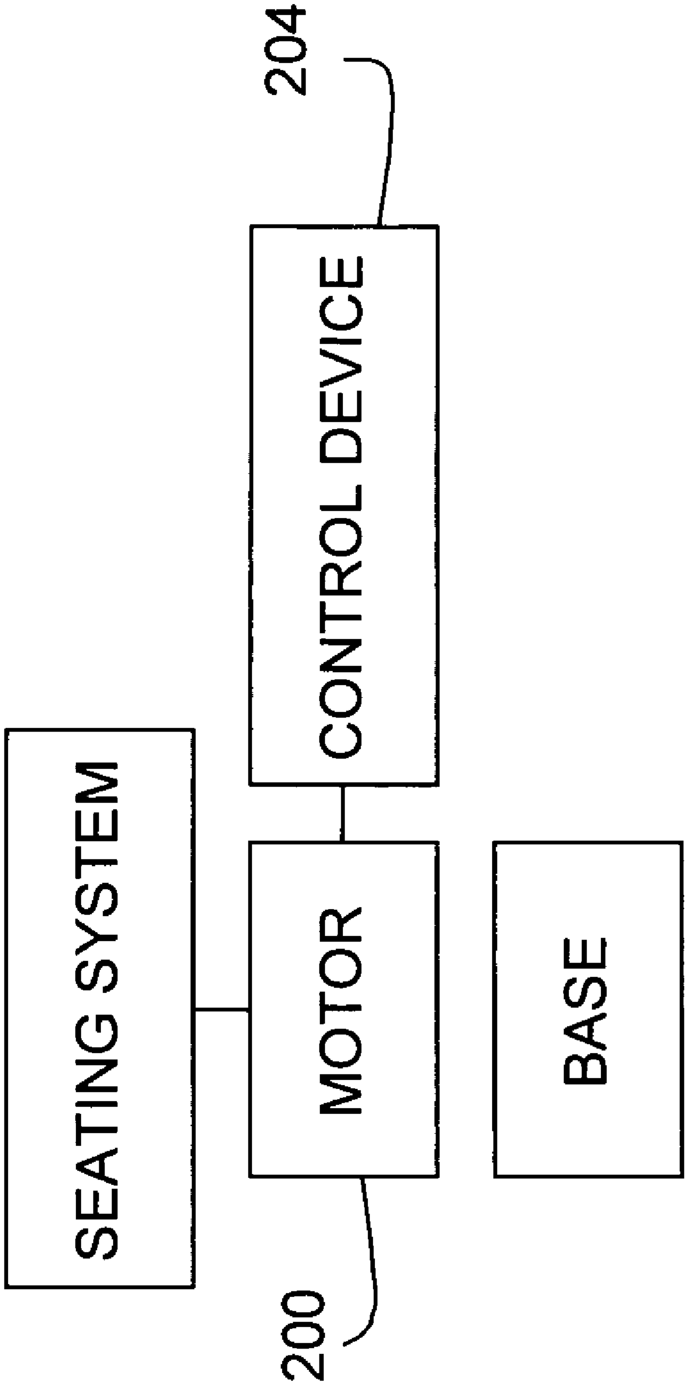
FIG. 20 is diagrammatic representation of a motor operatively connected between a base and a seat assembly according to the present invention.
Figure 21:
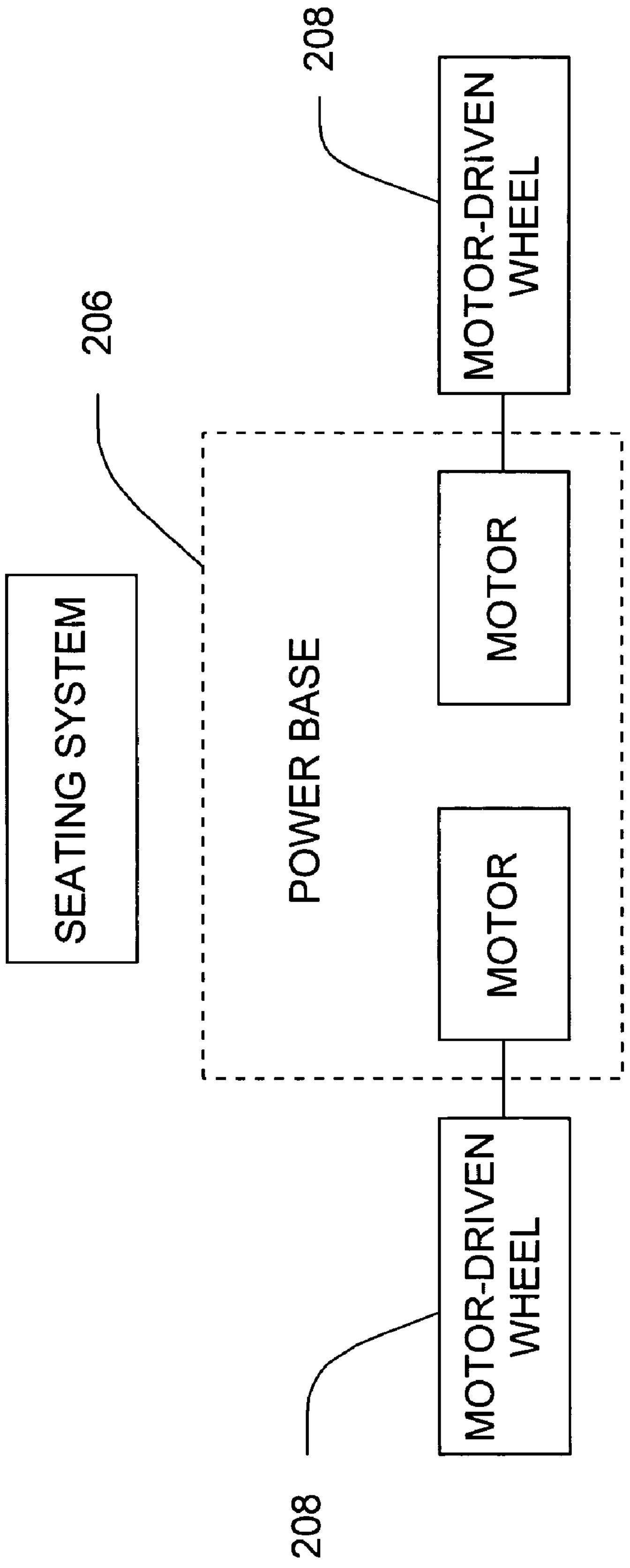
FIG. 21 is diagrammatic representation of seating system according to the present invention mounted on a power base with motor-driven wheels.

The invention described herein can be easily adapted to a battery-powered motor 200 or actuator that could drive the tilt angle of the seating system, as shown in FIG. 20. This adaptation could allow the tilt function of the wheelchair to be operated by a control device 204 that is accessible to either the attendant or the wheelchair occupant. Likewise, the center of gravity seating system described herein could be mounted on a power base 206 with motors 208 so that the wheels 210 of the chair can be motor-driven, as shown in FIG. 21.

The present invention is not intended to be limited to the embodiments shown and described above. The base and seat assembly illustrated and described above are merely provided for illustrative purposes. Other bases and seat frames can be suitable for carrying out the invention. The rockers are also provided for illustrative purposes. It should be understood that one or more tracks, other than the rockers shown and described, having radius curves with a center of curvature that is coincident with the wheelchair occupant's center of gravity may be suitable for carrying out the invention. The tracks can be supported by one of more rollers, slides, or other suitable low-friction support assemblies that allow the seat frame to rotate with respect to the base. Seat frame adjustments, including adjustments to the seat, the seat back, and the footrest assemblies, can be carried out in ways other than those set forth above. It should further be understood that the wheelchair may or may not accommodate growth and further that growth accommodation may be carried out in a manner other than that described. It should also be appreciated that the seat frame and support assembly can be adjustable in a manner other than that described.

The present invention achieves a truly stationary center of gravity during tilting. Minimal effort is required on the part of the attendant or the wheelchair occupant when tilting the seat assembly. No lifting or lowering of the occupant's center of gravity is required to tilt the seat assembly. Because the tilting is limited to pure rotation, the only effort required is to overcome friction within the system.

The wheelchair occupant does not experience a sensation of being pitched off balance during tilting. The sensation experienced during the center of gravity tilting is more reassuring to the occupant and less likely to induce inadvertent reactions that could potentially injure the wheelchair occupant.

The instant invention is also advantageous in that the wheelchair occupant's center of gravity remains stationary with respect to the base, thus increasing wheelchair stability and allowing for a shorter base length. Having a shorter base frame increases the maneuverability of the wheelchair and creates a smaller overall footprint for the wheelchair, allowing it to fit within tighter confines.

Lastly, the present invention permits the weight distribution on the front and rear wheels of the wheelchair to remain constant while tilting the seat frame 20. The well-defined weight distribution assists in controlling and steering of the wheelchair.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A wheelchair comprising:

a base;

a plurality of wheels that are adapted to support the base relative to a supporting surface;

a seat for supporting an occupant; and one or more tracks supporting the seat, the one or more tracks serving as a rolling or sliding surface that allows the seat to rotate with respect to the base, the one or more tracks having a substantially constant-radius arc with a focal point that is adapted to be substantially coincident with the center of gravity of the wheelchair occupant.

2. A wheelchair according to claim 1 wherein the plurality of wheels comprises front and rear wheels that are adjustable fore and aft relative to the focal point so that the distance between the front and rear wheels can be shortened or lengthened.

3. A wheelchair according to claim 1 further comprising a low friction support assembly supporting the seat relative to the base, the low friction support assembly being adjustable to change an overall range of seat tilt by fixing the low friction support assembly to the base at different angular orientations.

4. A wheelchair according to claim 1 further comprising a low friction support assembly comprising one or more rollers that support each of the one or more tracks so that the one or more tracks are free to rotate in a direction of rotation upon the one or more rollers but are otherwise constrained by the rollers from moving traverse to the direction of rotation.

5. A wheelchair according to claim 4 wherein the one or more tracks and the corresponding one or more rollers each has at least a portion thereof that has a mating cross-sectional contour that prevents transverse movement of the rollers.

6. A wheelchair according to claim 1 wherein the seat is an element of an adjustable seating system that allows the center of gravity of a wheelchair occupant to be moved fore and aft in order to locate the center of gravity at the focal point of the substantially constant-radius arc.

7. A wheelchair according to claim 6 wherein the adjustable seating system comprises a seat frame that, in addition to the seat, includes a backrest and a footrest assembly, all of which are adapted to be adjusted fore and aft with respect to the focal point.

8. A wheelchair comprising:

a base;

a plurality of wheels that are adapted to support the base relative to a supporting surface;

a seat for supporting an occupant;

one or more tracks supporting the seat, the one or more tracks serving as a rolling or sliding surface that allows the seat to rotate with respect to the base, the one or more tracks having a substantially constant-radius arc with a focal point that is adapted to be substantially coincident with the center of gravity of the wheelchair occupant; and a motor operatively connected between the base and the seat so that the seat can be rotated about the center of gravity of a wheelchair occupant.

9. A wheelchair according to claim 1 further comprising motors operatively connected to one or more of the plurality of wheels for driving the wheels operatively connected thereto.

10. A wheelchair comprising:

a base;

front and rear wheels that are adapted to support the base relative to a supporting surface;

a seat for supporting an occupant; and one or more tracks supporting the seat, the one or more tracks serving as a rolling or sliding surface that allows the seat to rotate with respect to the base, the one or more tracks having a substantially constant-radius arc with a focal point that is adapted to be substantially coincident with the center of gravity of the wheelchair occupant, wherein the one or more tracks are adjustable fore and aft with respect to the base and the front and rear wheels so that the position of the focal point relative to the front and rear wheels may be changed.

11. A wheelchair comprising:

a base;

a plurality of wheels that are adapted to support the base relative to a supporting surface;

a seat for supporting an occupant;

one or more tracks supporting the seat, the one or more tracks serving as a rolling or sliding surface that allows the seat to rotate with respect to the base, the one or more tracks having a substantially constant-radius arc with a focal point that is adapted to be substantially coincident with the center of gravity of the wheelchair occupant; and one or more protrusions that are adapted to be engaged with one or more recesses in the one or more tracks so that the protrusions enter the recesses to lock the tracks into an angular position and are adapted to be retracted from the recesses so that the seat can be rotated to a different tilt angle relative to the base.

12. A wheelchair comprising:

a base;

a plurality of wheels that are adapted to support the base relative to a supporting surface;

a seat for supporting an occupant; and one or more curved tubes supporting the seat, the one or more tubes serving as a rolling or sliding surface that allows the seat to rotate with respect to the base, the one or more tubes having a substantially constant-radius arc with a focal point that is adapted to be substantially coincident with the center of gravity of the wheelchair occupant.

13. A wheelchair according to claim 12 further comprising pivoting plates with holes therein situated about each of the one or more curved tubes, the holes being slightly larger than the diameter of the tube so that the tube can pass freely through the plates when the plates are pivoted so that axes of the holes are aligned with the arc of the tube and so that the tube is prevented from passing through the plates when the plates are pivoted so that the axes of the holes are not aligned with the arc of the tube.

14. A wheelchair comprising:

a base;

a plurality of wheels that are adapted to support the base relative to a supporting surface;

an adjustable seating system for supporting an occupant, the adjustable seating system including a seat, a backrest, and a footrest assembly, the seat comprising a seat frame that further comprises laterally spaced side tubes and the backrest comprising laterally spaced canes supported relative to the side tubes by couplings, the couplings including an assembly of plates having upper ends operatively attached to one another and lower ends attached to the side tubes so that the lower ends of the plates can move relative to the side tubes while remaining operatively connected to the side tubes; and one or more tracks supporting the seat assembly, the one or more tracks serving as a rolling or sliding surface that allows the seat to rotate with respect to the base, the one or more tracks having a substantially constant-radius arc with a focal point that is adapted to be substantially coincident with the center of gravity of the wheelchair occupant, the seat, the backrest, and the footrest assembly being adjusted fore and aft with respect to the focal point.

15. A wheelchair comprising:

a base;

a plurality of wheels that are adapted to support the base relative to a supporting surface;

a seat;

one or more tracks located between the base and the seat, the one or more tracks having a constant-radius arc supporting the seat for movement in fore and aft directions relative to the base; and a low friction support supported by one of either the base or the seat, the low friction support comprising low friction elements that mate with the one or more tracks to provide sole support for the one or more tracks.

16. A wheelchair comprising:

a base;

a plurality of wheels that are adapted to support the base relative to a supporting surface;

a seat;

one or more tracks having a constant-radius arc supporting the seat for movement relative to the base; and a low friction support assembly supported by one of either the base or the seat, the support permitting an overall tilt angle range of the seat to be adjusted.

17. A wheelchair according to claim 16 wherein the low friction support assembly is a carriage supported by one of either the base or the seat, the carriage being angularly adjustable in a vertical plane relative to the base or the seat to permit the overall tilt angle range of the seat to be adjusted.

18. A wheelchair comprising:

a base;

a plurality of wheels that are adapted to support the base relative to a supporting surface;

a seat for supporting an occupant;

one or more tracks supporting the seat, the one or more tracks having a constant-radius arc with a focal point that is adapted to be coincident with the center of gravity of a wheelchair occupant; and the wheelchair seat being structured to be adjusted while maintaining the focal point of the constant-radius arc of the one or more tracks coincident with the center of gravity of the wheelchair occupant.

19. A wheelchair according to claim 18 wherein the seat has a depth that is measured in a fore and aft direction and the seat is structured to permit the seat depth to be adjusted.

20. A wheelchair according to claim 19 wherein the seat has a seat back that is adjustable fore and aft.

21. A wheelchair according to claim 19 wherein the seat has leg rests that are adjustable fore and aft.

22. A wheelchair according to claim 18 wherein the seat is adjustable fore and aft relative to the base.

23. A wheelchair according to claim 18 wherein the seat has a surface for supporting the occupant and the surface is adjustable in height.

24. A wheelchair comprising:

a base;

a plurality of wheels that are adapted to support the base relative to a supporting surface;

a seat for supporting an occupant; and one or more tracks supporting the seat, the one or more tracks serving as a rolling or sliding surface that allows the seat to rotate in fore and aft directions with respect to the base, the one or more tracks having a substantially constant-radius arc with a focal point that is adapted to be substantially coincident with the center of gravity of the wheelchair occupant.

25. A wheelchair comprising:

a base;

a plurality of wheels that are adapted to support the base relative to a supporting surface;

a seat;

one or more tracks having a substantially constant-radius arc having a focal point, the constant-radius arc supporting the seat for tilt movement in fore and aft directions relative to the base over a range of tilt angles; and a low friction support assembly supported by one of either the base or the seat, the support assembly being adjustable to permit the range of tilt angles to be rotated relative to the focal point.

26. A wheelchair comprising:

a base;

a plurality of wheels adapted to support the base;

a seat for supporting an occupant;

one or more arcuate tracks supporting the seat and operatively associated with the seat to permit rotation of the seat relative to the base; and the seat being horizontally adjustable to permit fore and aft positioning of the occupant's center of gravity relative to the one or more arcuate tracks.

27. A wheelchair according to claim 26 wherein the one or more arcuate tracks comprises a constant-radius arc with a focal point, and the seat may be adjusted to locate the occupant's center of gravity in substantial fore/aft alignment with the focal point of the one or more arcuate tracks.

28. A wheelchair according to claim 26 wherein the one or more arcuate tracks comprise the sole track support for the seat relative to the base.

29. A wheelchair according to claim 26 wherein the seat includes a backrest frame and one or more foot supports, and the adjustment of the seat includes fore and aft positioning of both the backrest frame and the one or more footrests to maintain a generally consistent seating orientation for the occupant at different fore and aft locations of the seat.

30. A wheelchair according to claim 26 wherein the seat and one or more supporting tracks comprise an occupant support assembly and the entire occupant support assembly is horizontally adjustable relative to the base.

31. A wheelchair according to claim 30 wherein the occupant support assembly may be adjusted relative to the base without moving the seat relative to the one or more supporting tracks.

32. A wheelchair according to claim 26 wherein the angular orientation of the one or more arcuate tracks may be adjusted relative to the base to permit variation in the overall range of seat tilt achieved through rotation of the seat.

* * * * *